US012345654B2

(12) United States Patent
Urano et al.

(10) Patent No.: US 12,345,654 B2
(45) Date of Patent: Jul. 1, 2025

(54) DEFECT INSPECTION DEVICE, DEFECT INSPECTION METHOD, AND ADJUSTMENT SUBSTRATE

(71) Applicant: HITACHI HIGH-TECH CORPORATION, Tokyo (JP)

(72) Inventors: Yuta Urano, Tokyo (JP); Eiji Arima, Tokyo (JP); Hiromichi Yamakawa, Tokyo (JP); Toshifumi Honda, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 155 days.

(21) Appl. No.: 18/271,496

(22) PCT Filed: Mar. 9, 2021

(86) PCT No.: PCT/JP2021/009316
§ 371 (c)(1),
(2) Date: Jul. 10, 2023

(87) PCT Pub. No.: WO2022/190210
PCT Pub. Date: Sep. 15, 2022

(65) Prior Publication Data
US 2024/0133824 A1 Apr. 25, 2024
US 2024/0230551 A9 Jul. 11, 2024

(51) Int. Cl.
*G01N 21/88* (2006.01)
*G01N 21/93* (2006.01)

(52) U.S. Cl.
CPC ..... *G01N 21/8806* (2013.01); *G01N 21/8851* (2013.01); *G01N 21/93* (2013.01); *G01N 2021/8848* (2013.01)

(58) Field of Classification Search
CPC ........... G01N 21/8806; G01N 21/8848; G01N 21/8851
See application file for complete search history.

(56) References Cited

U.S. PATENT DOCUMENTS

2008/0117437 A1 5/2008 Vuong et al.
2010/0014083 A1 1/2010 Ueno et al.
(Continued)

FOREIGN PATENT DOCUMENTS

JP 2008-129017 A 6/2008
JP 2010-025713 A 2/2010
(Continued)

OTHER PUBLICATIONS

International Search Report of PCT/JP2021/009316 dated May 25, 2021.
(Continued)

*Primary Examiner* — Thanh Luu
(74) *Attorney, Agent, or Firm* — MATTINGLY & MALUR, PC

(57) ABSTRACT

A defect inspection device includes: an illumination optical system including a polarization element configured to switch polarization of irradiation light between first polarization and second polarization orthogonal to the first polarization; a polarization diffraction grating configured to emit diffraction light of a specific order of the irradiation light in a direction along a normal line of a sample stage surface, a diffraction efficiency of the specific order of the first polarization of the irradiation light is equal to or less than 20% of a diffraction efficiency of the specific order of the second polarization, the polarization diffraction grating being settable at a light collection position of the irradiation light on the sample stage surface and including an anisotropic pattern whose period is equal to or less than twice a wavelength of the irradiation light; a detection optical system.

8 Claims, 20 Drawing Sheets

(56) References Cited

U.S. PATENT DOCUMENTS

| | | |
|---|---|---|
| 2012/0133928 A1 | 5/2012 | Urano et al. |
| 2013/0188184 A1 | 7/2013 | Taniguchi et al. |
| 2015/0276623 A1* | 10/2015 | Urano .............. G01N 21/95607 356/369 |
| 2015/0323471 A1 | 11/2015 | Sapiens et al. |
| 2015/0346112 A1 | 12/2015 | Jingu et al. |
| 2016/0033398 A1 | 2/2016 | Kim et al. |
| 2017/0146463 A1 | 5/2017 | Honda et al. |
| 2018/0224749 A1 | 8/2018 | Measor et al. |

FOREIGN PATENT DOCUMENTS

| | | |
|---|---|---|
| JP | 2011-0002314 A | 1/2011 |
| JP | 2012-047654 A | 3/2012 |
| JP | 2013-238600 A | 11/2013 |
| JP | 2015-197320 A | 11/2015 |
| JP | 2017-523591 A | 8/2017 |
| JP | 2020-506552 A | 2/2020 |
| WO | 02/082064 A1 | 10/2002 |
| WO | 2014/109205 A1 | 7/2014 |

OTHER PUBLICATIONS

Written Opinion of the International Searching Authority PCT/JP2021/009316 dated May 25, 2021.

\* cited by examiner

[FIG. 1]
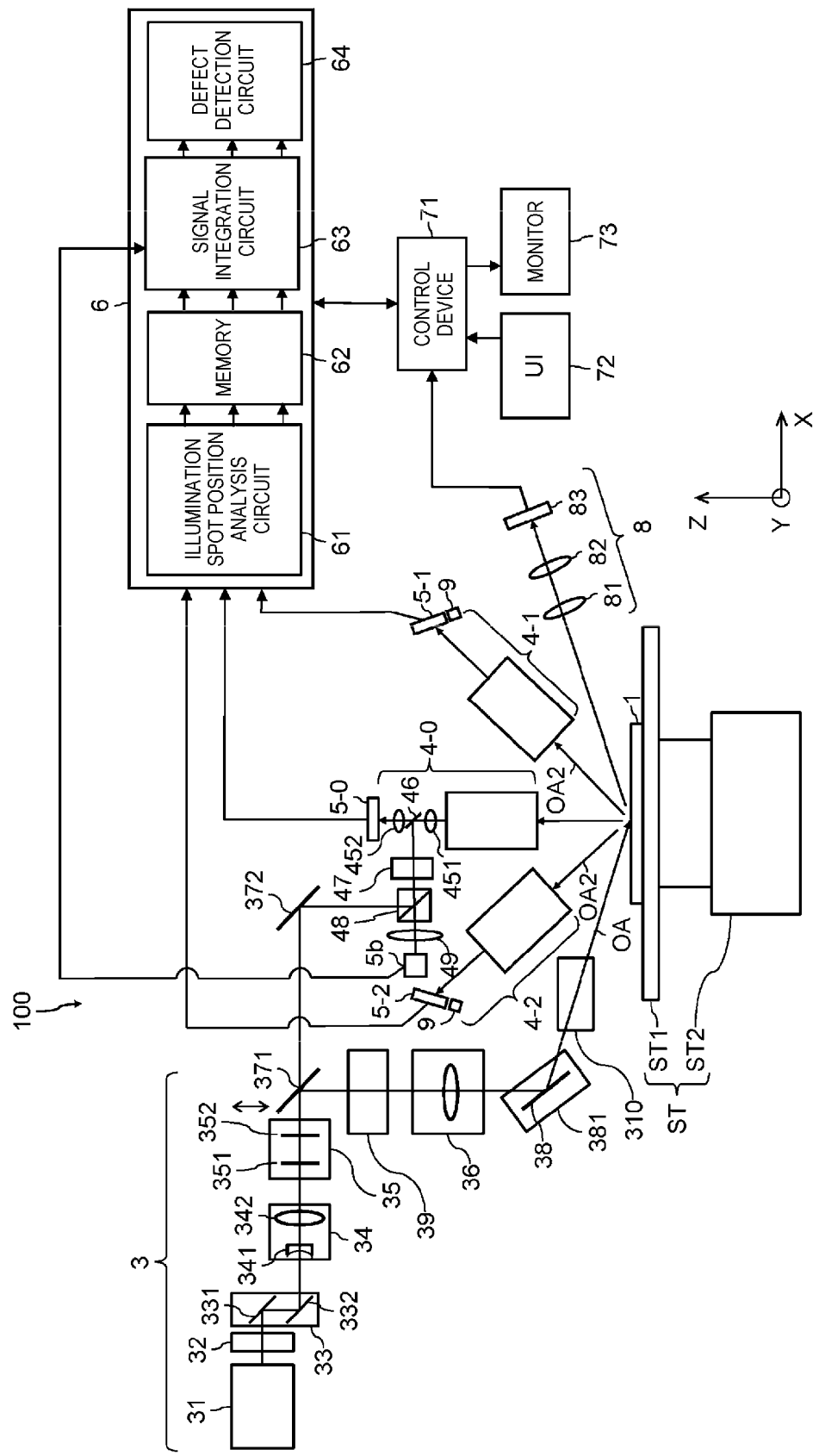

[FIG. 2]
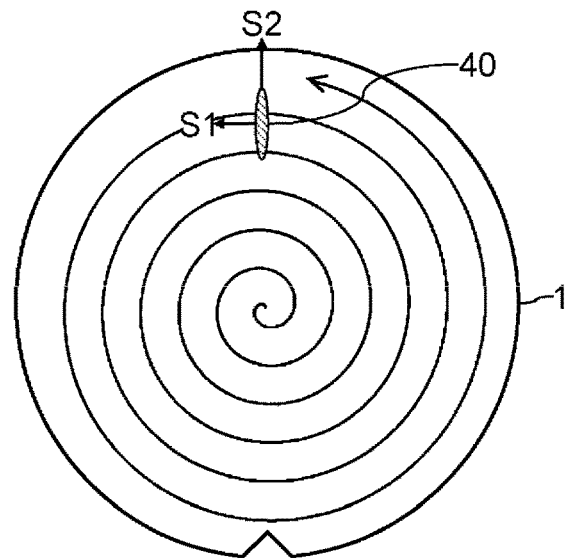
[FIG. 3]
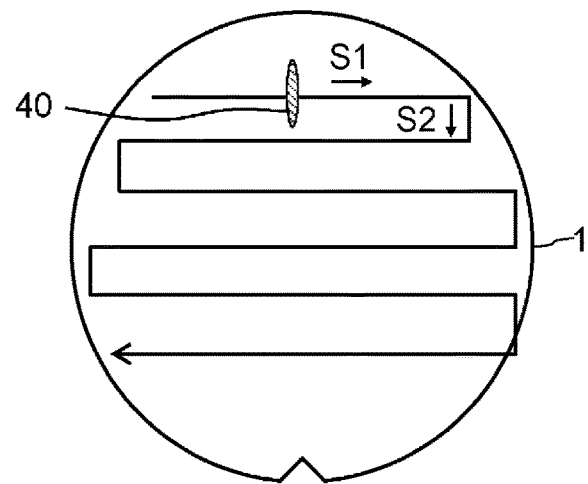
[FIG. 4]
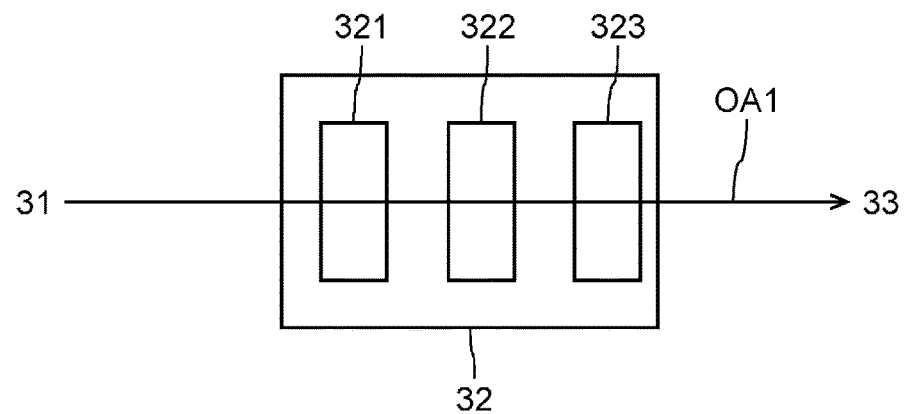

[FIG. 5]
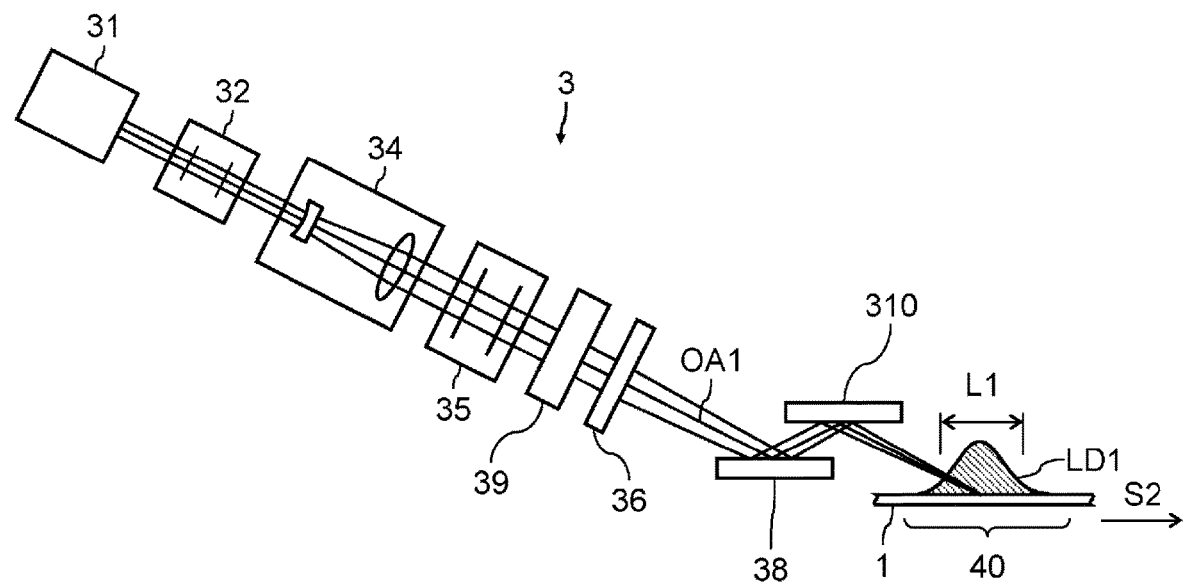
[FIG. 6]
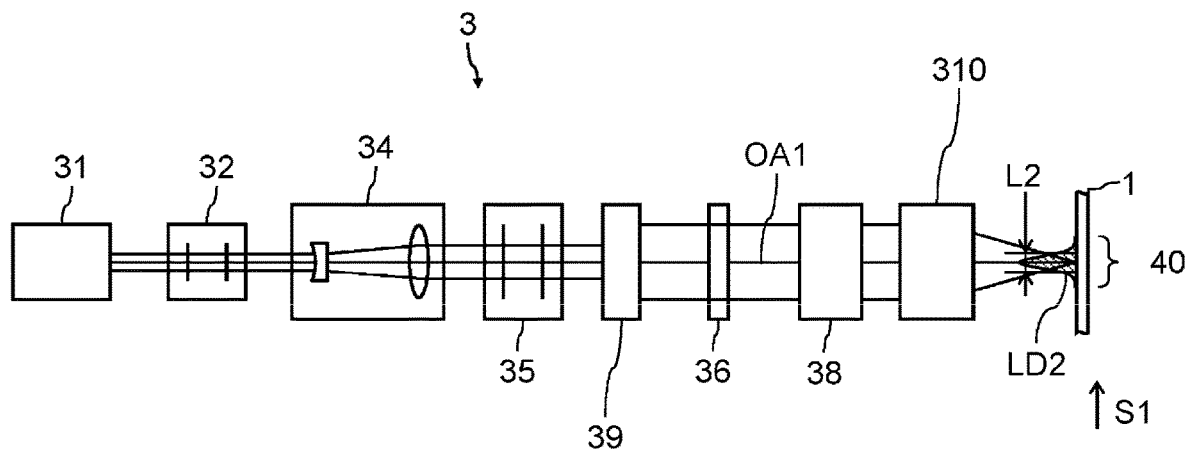

[FIG. 7]
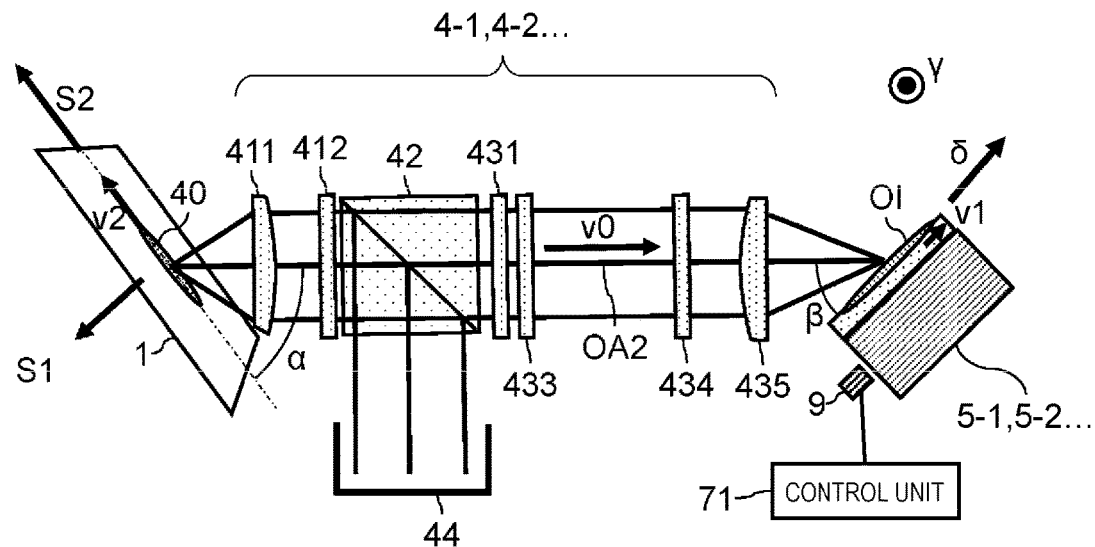
[FIG. 8]
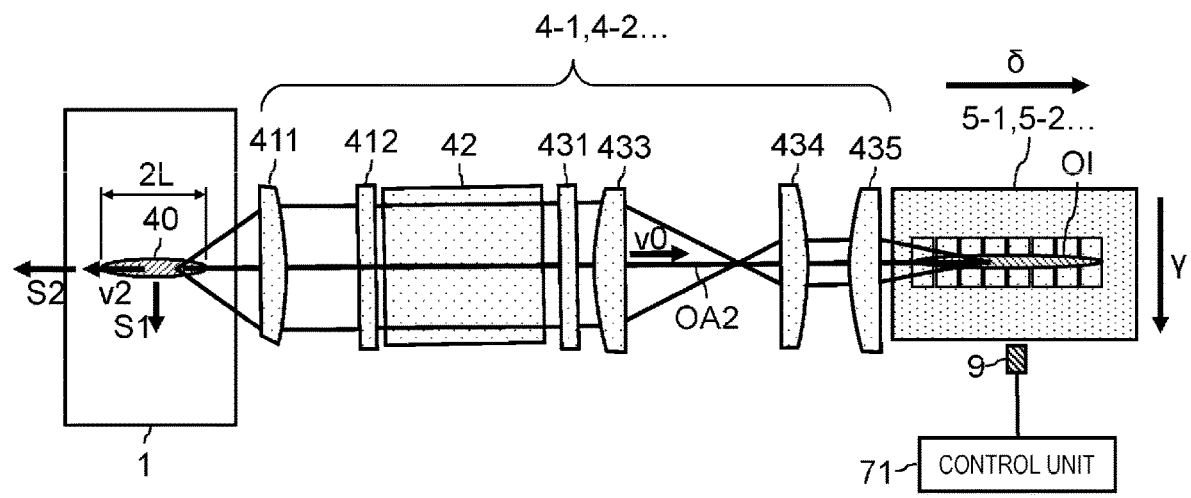

[FIG. 9]
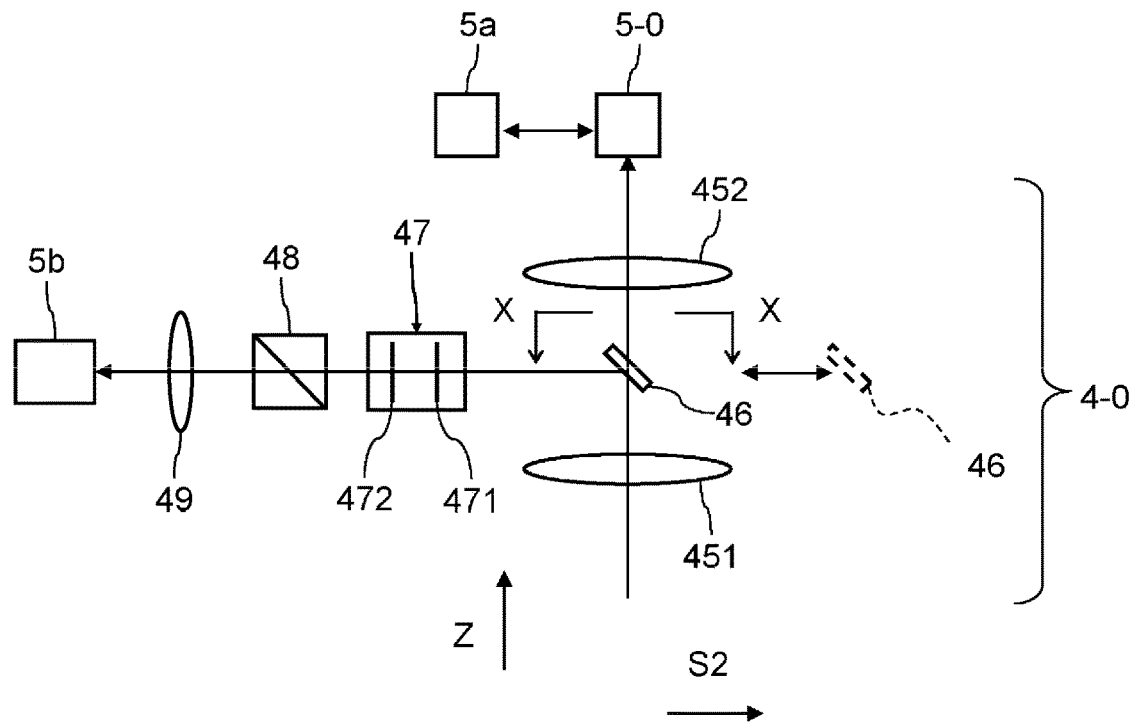
[FIG. 10]
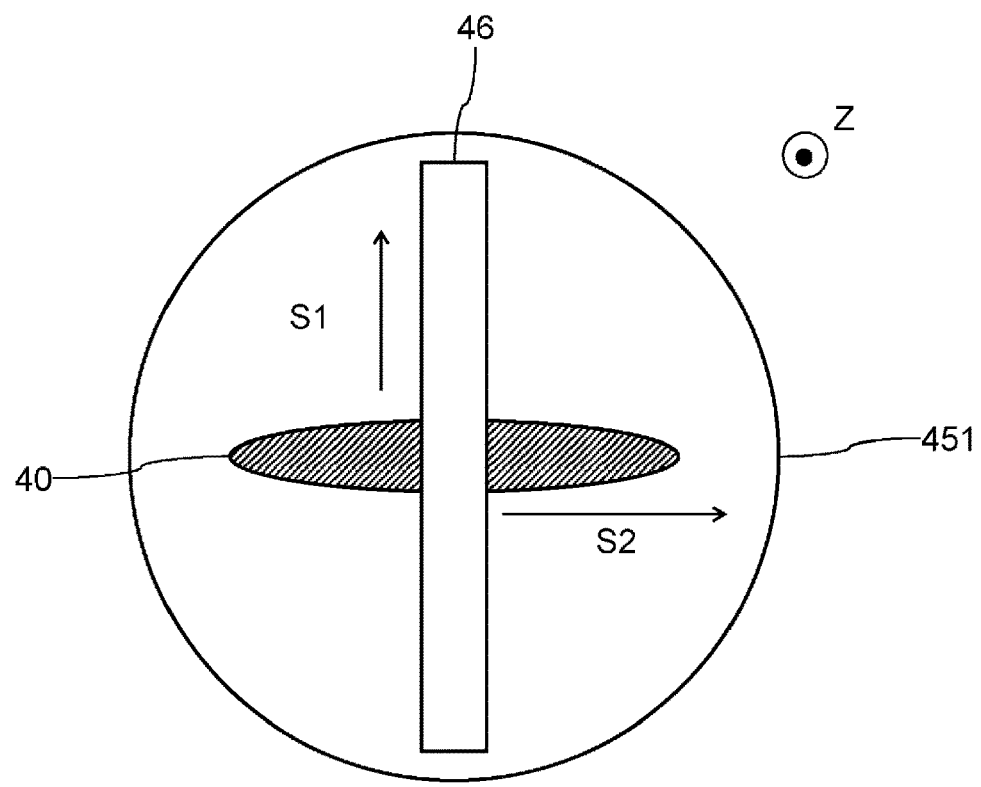

[FIG. 11]
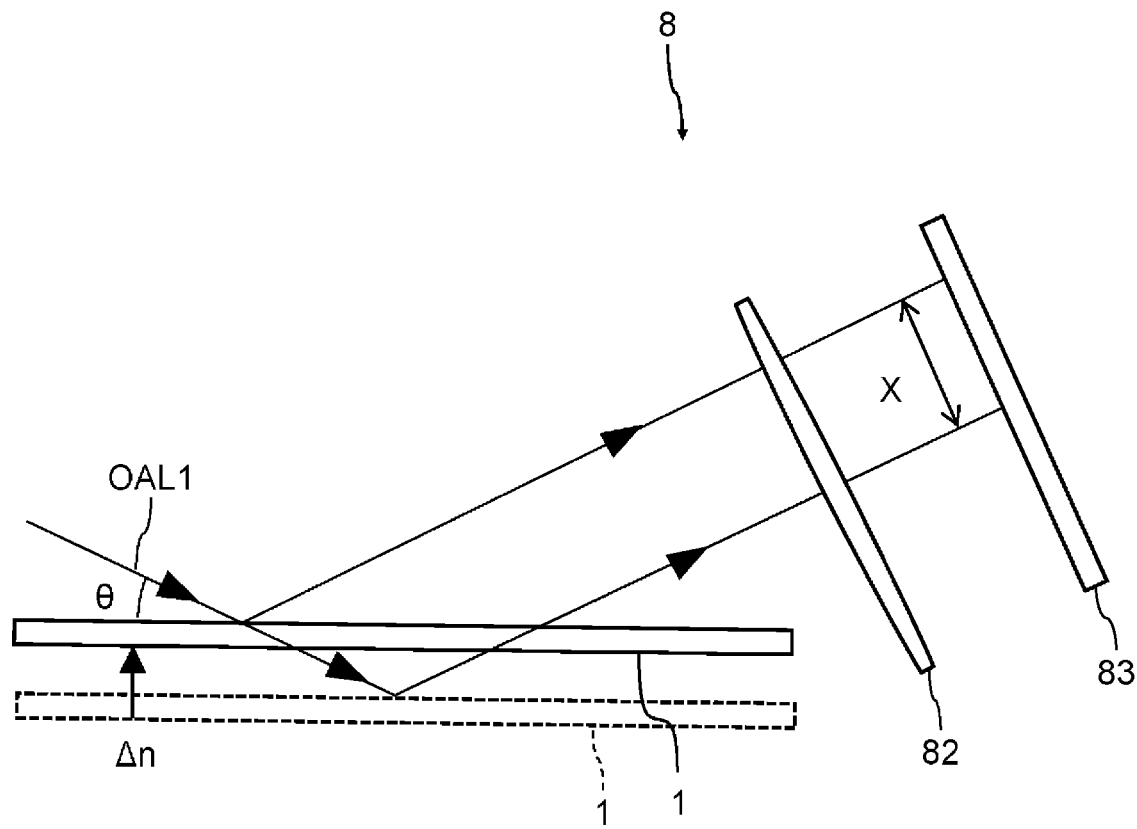

[FIG. 12]
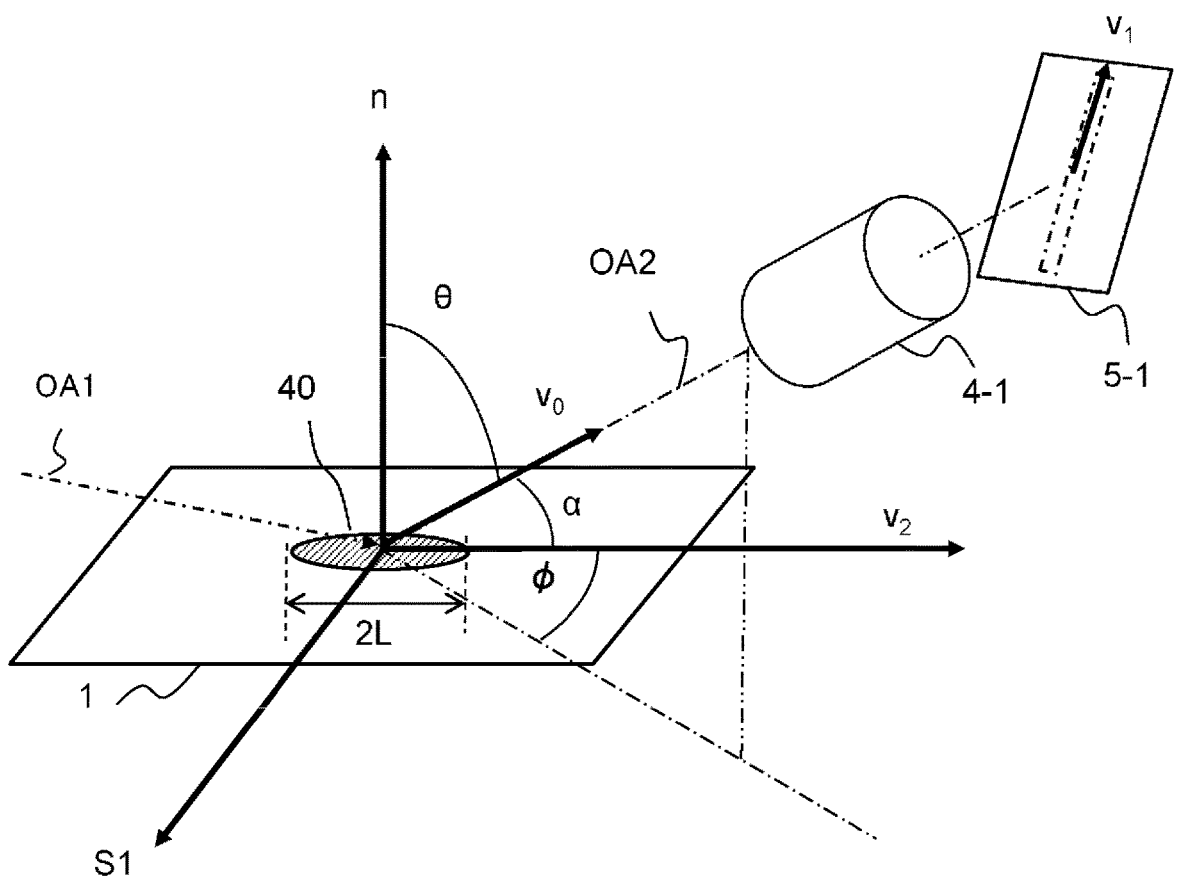

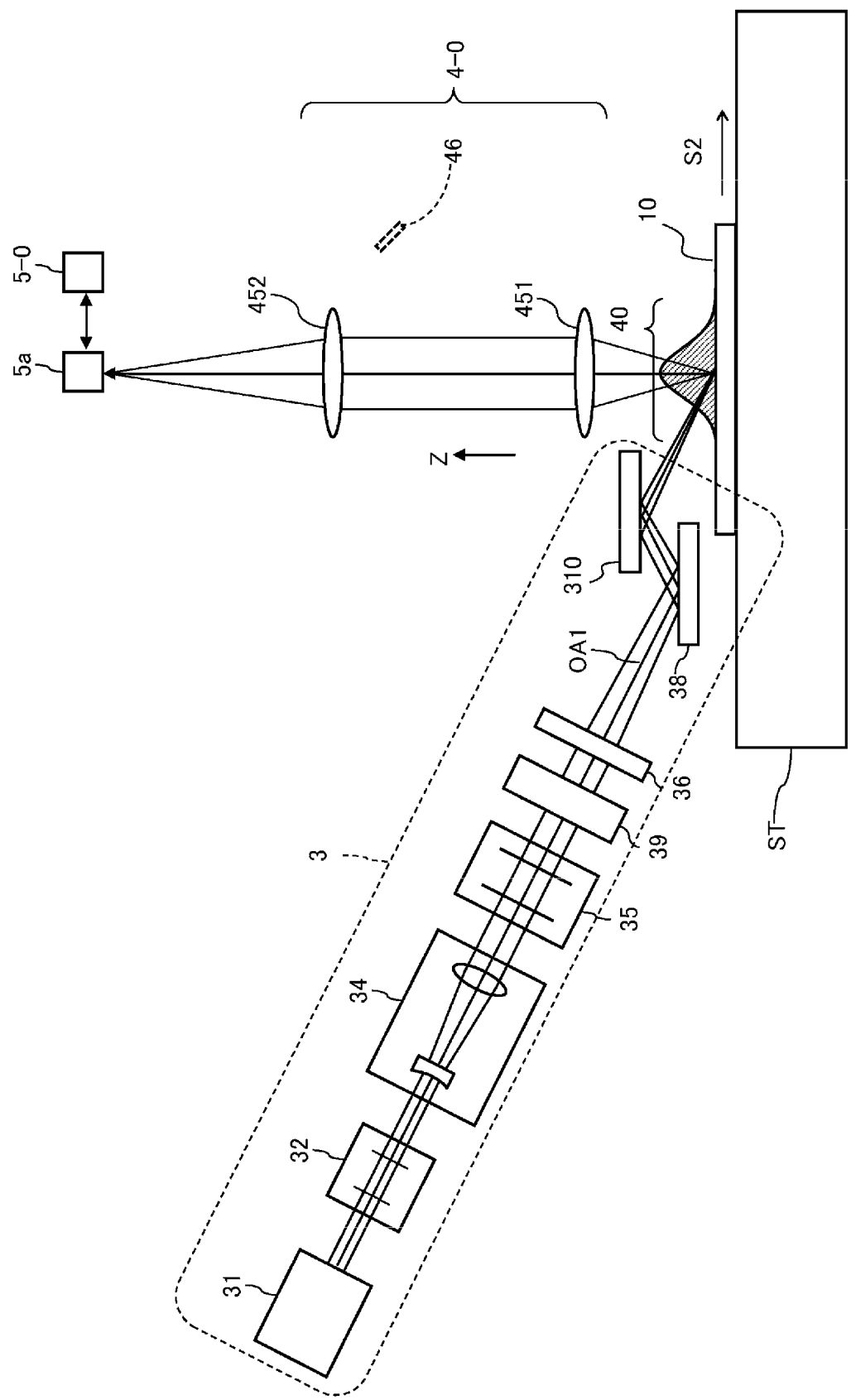
[FIG. 13]

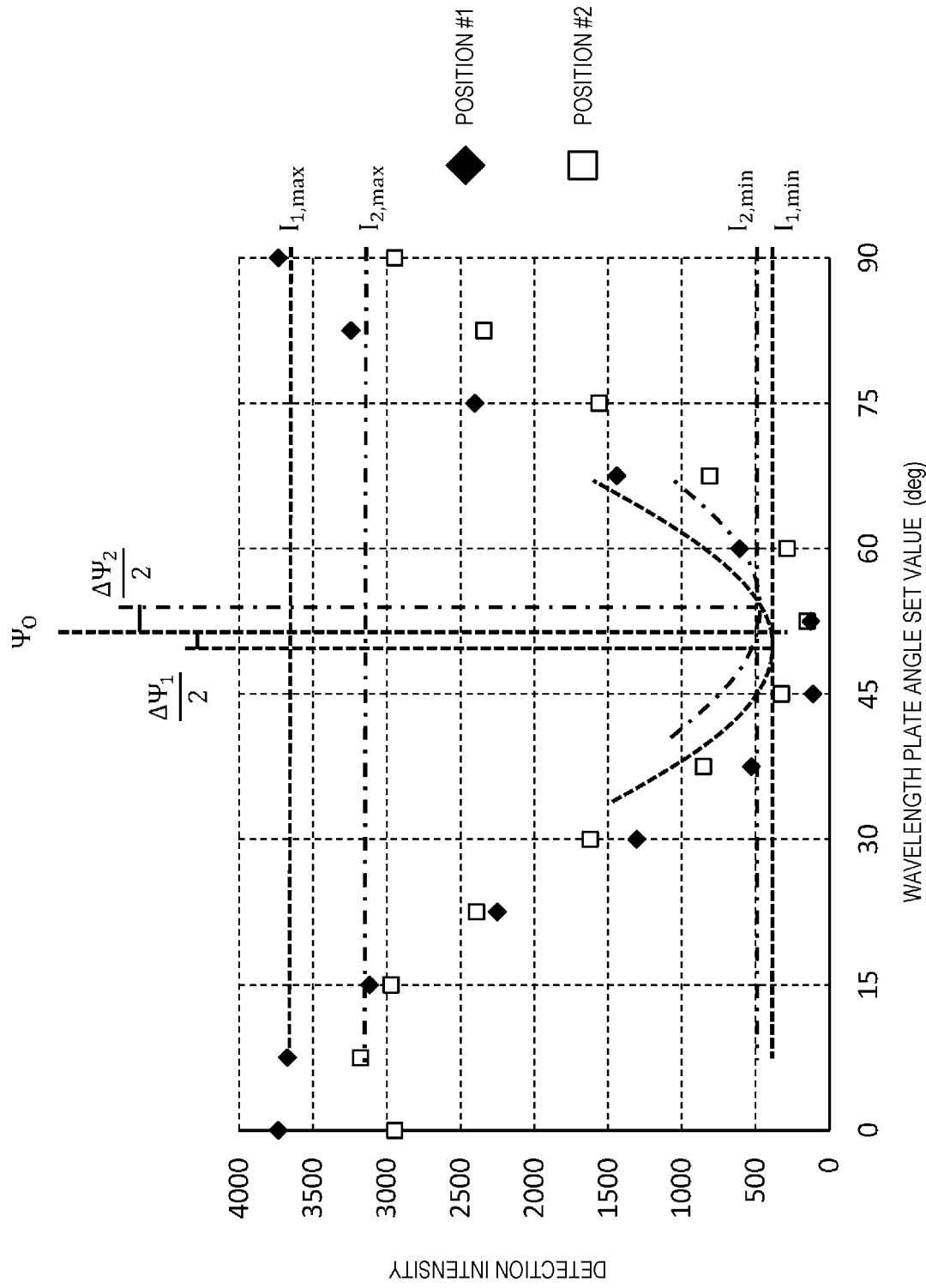
[FIG. 14]

[FIG. 15]
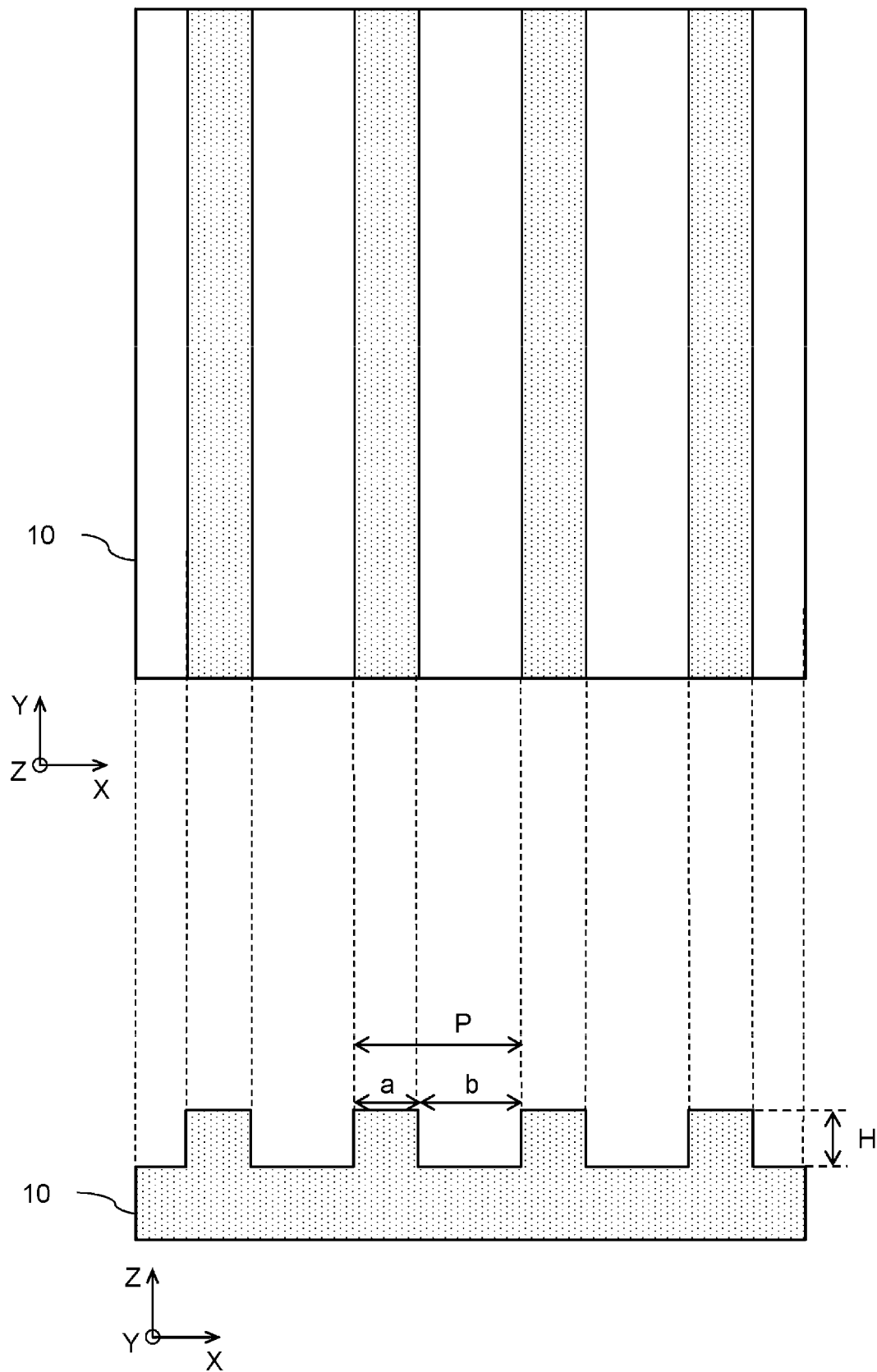

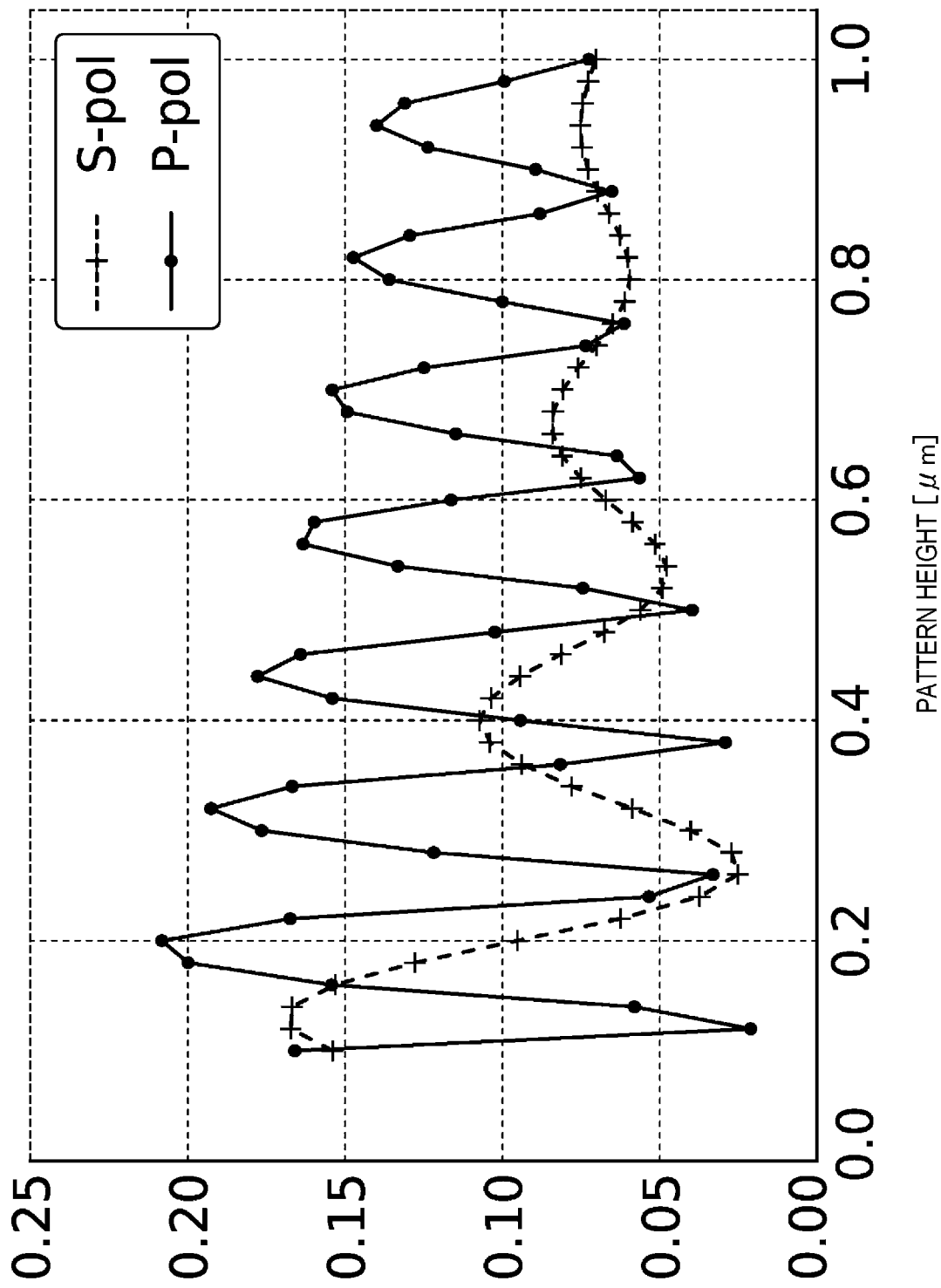
[FIG. 16A]

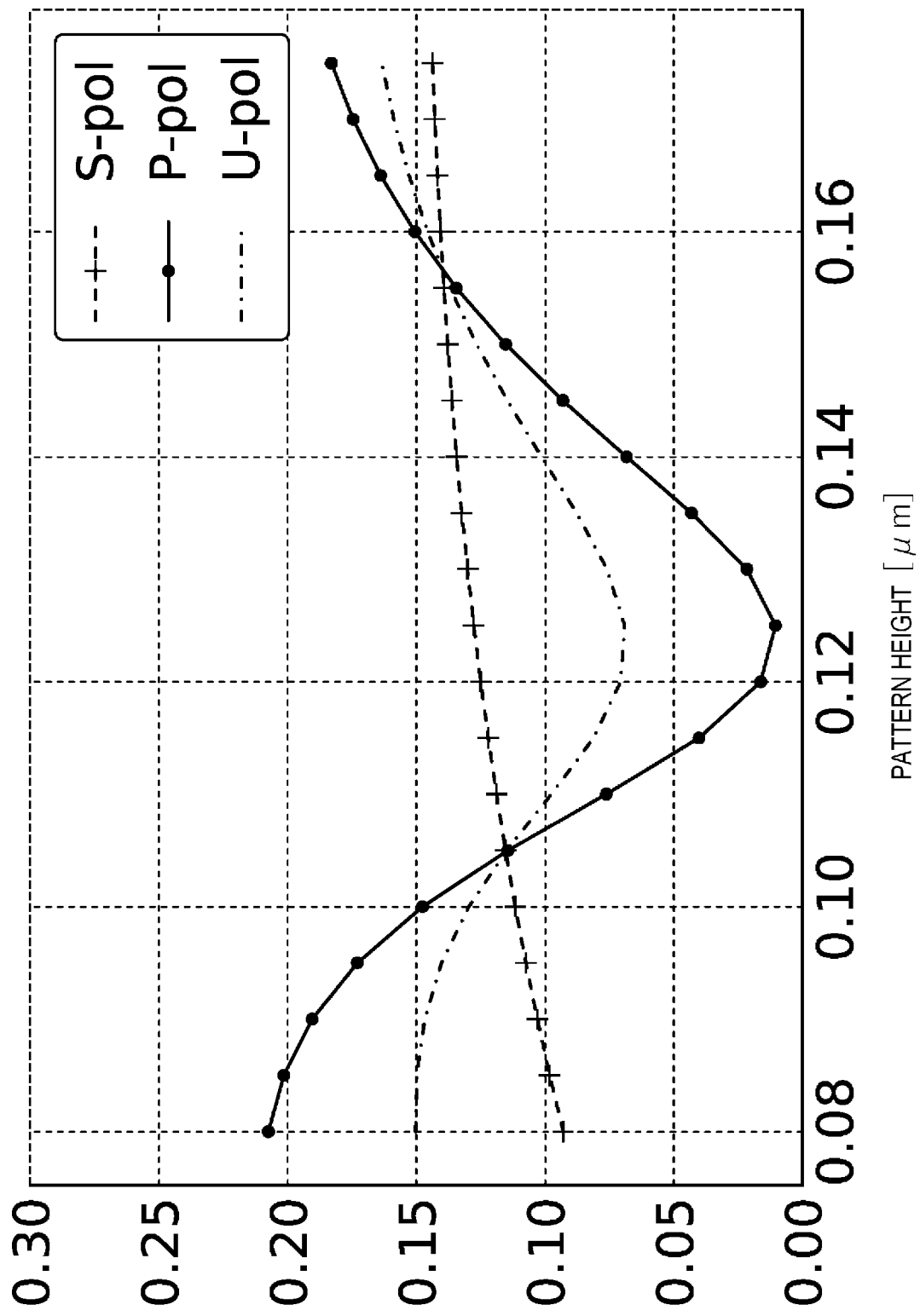
[FIG. 16B]

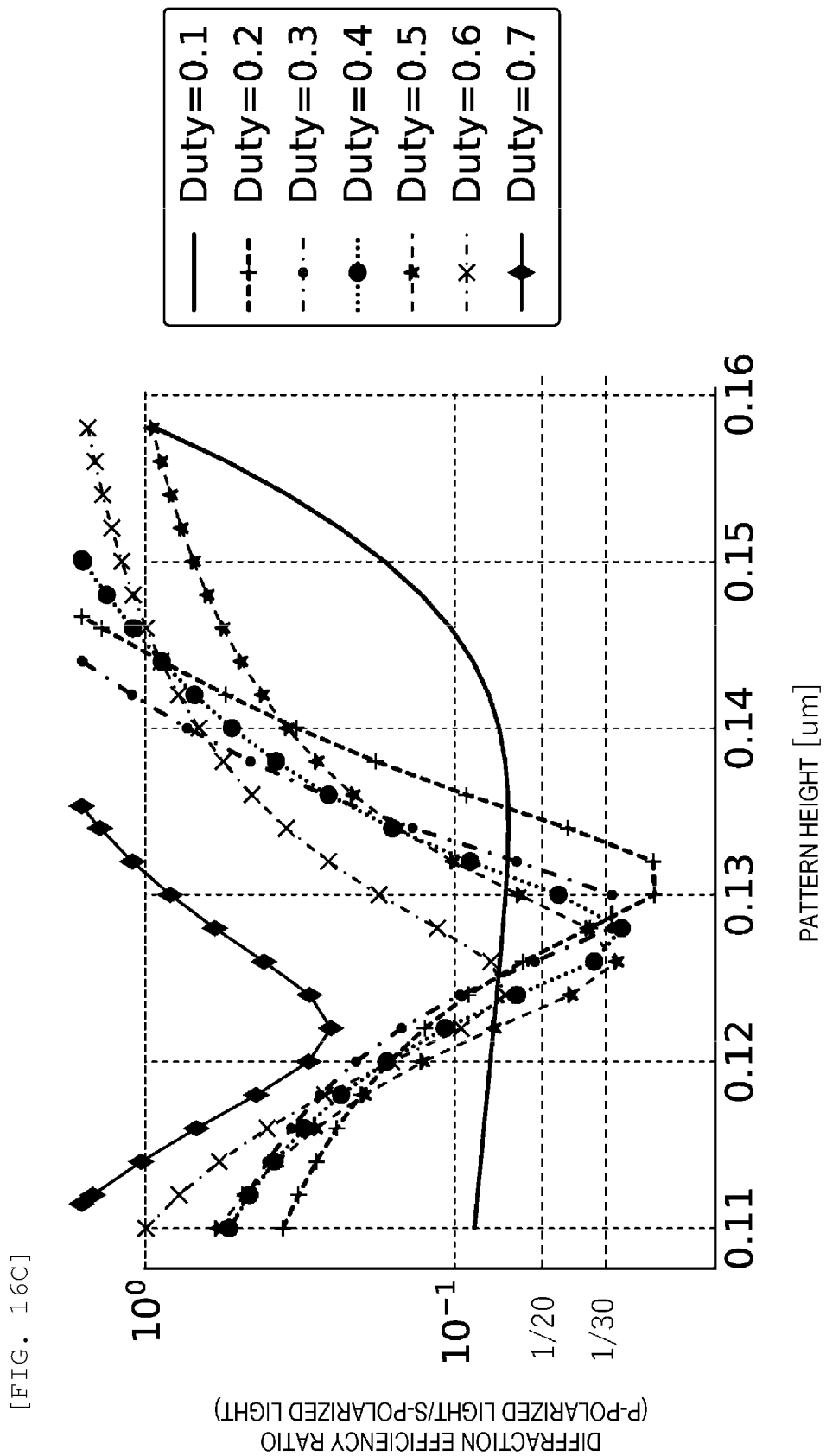
[FIG. 16C]

[FIG. 17A]
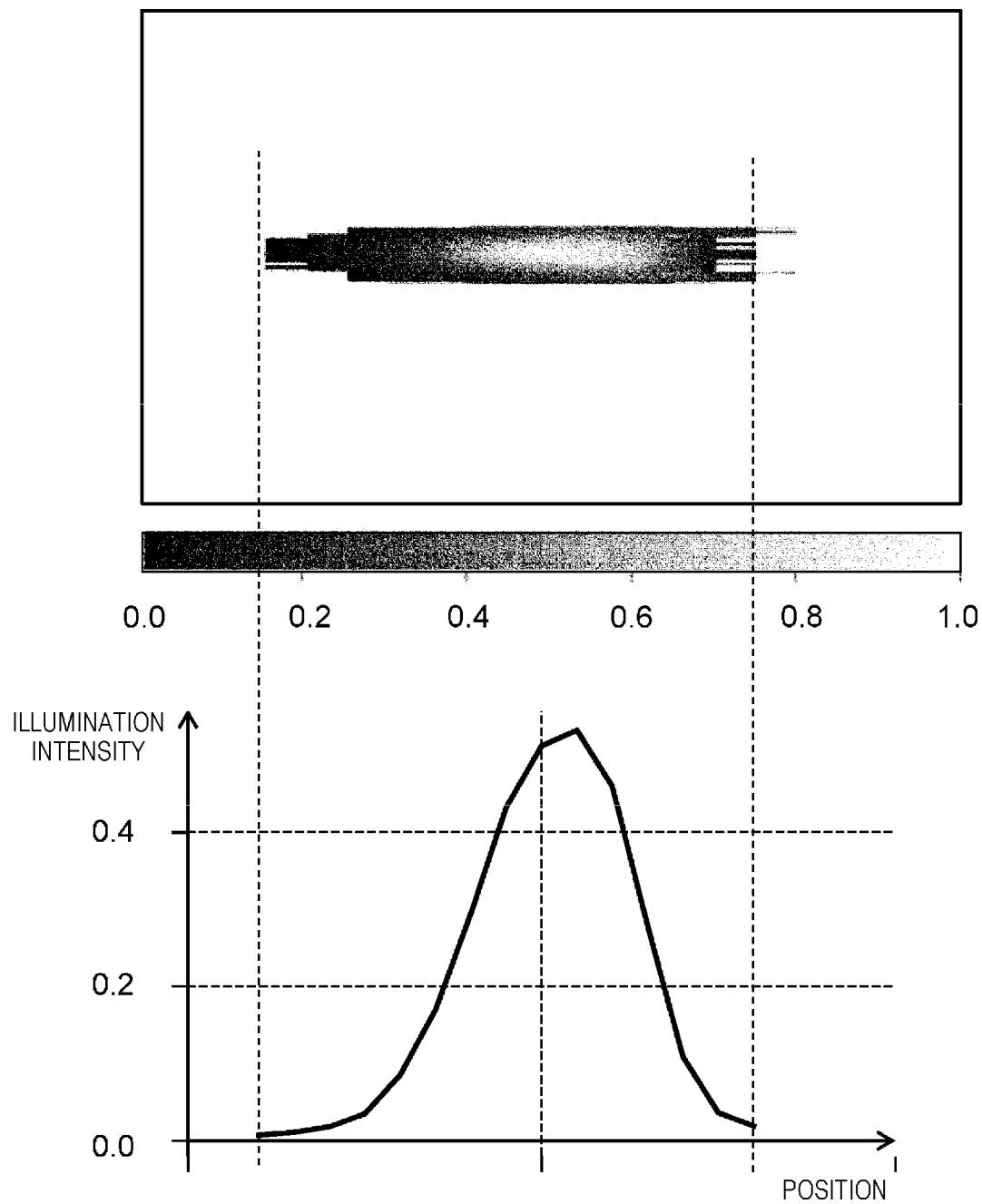

[FIG. 17B]
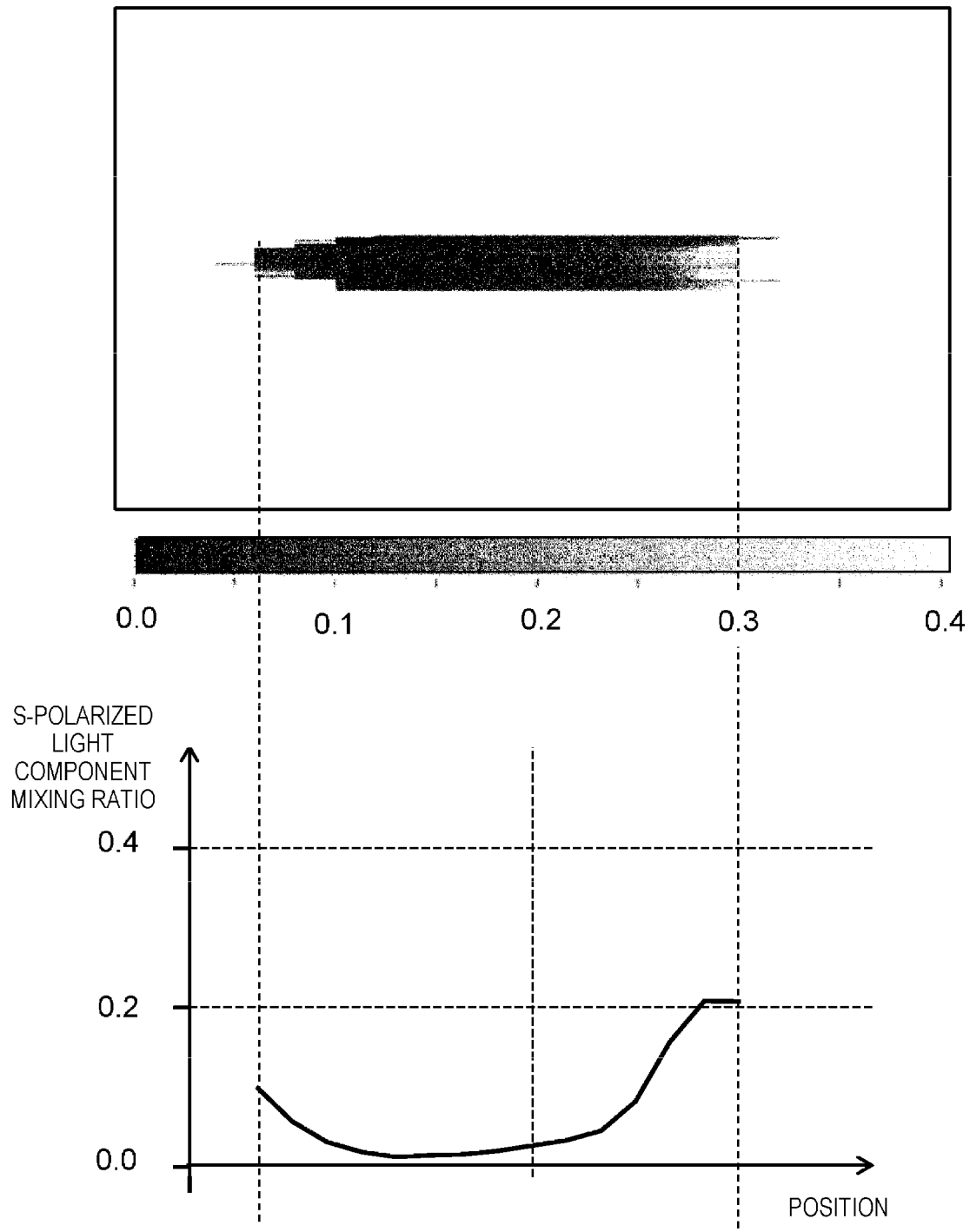

[FIG. 17C]
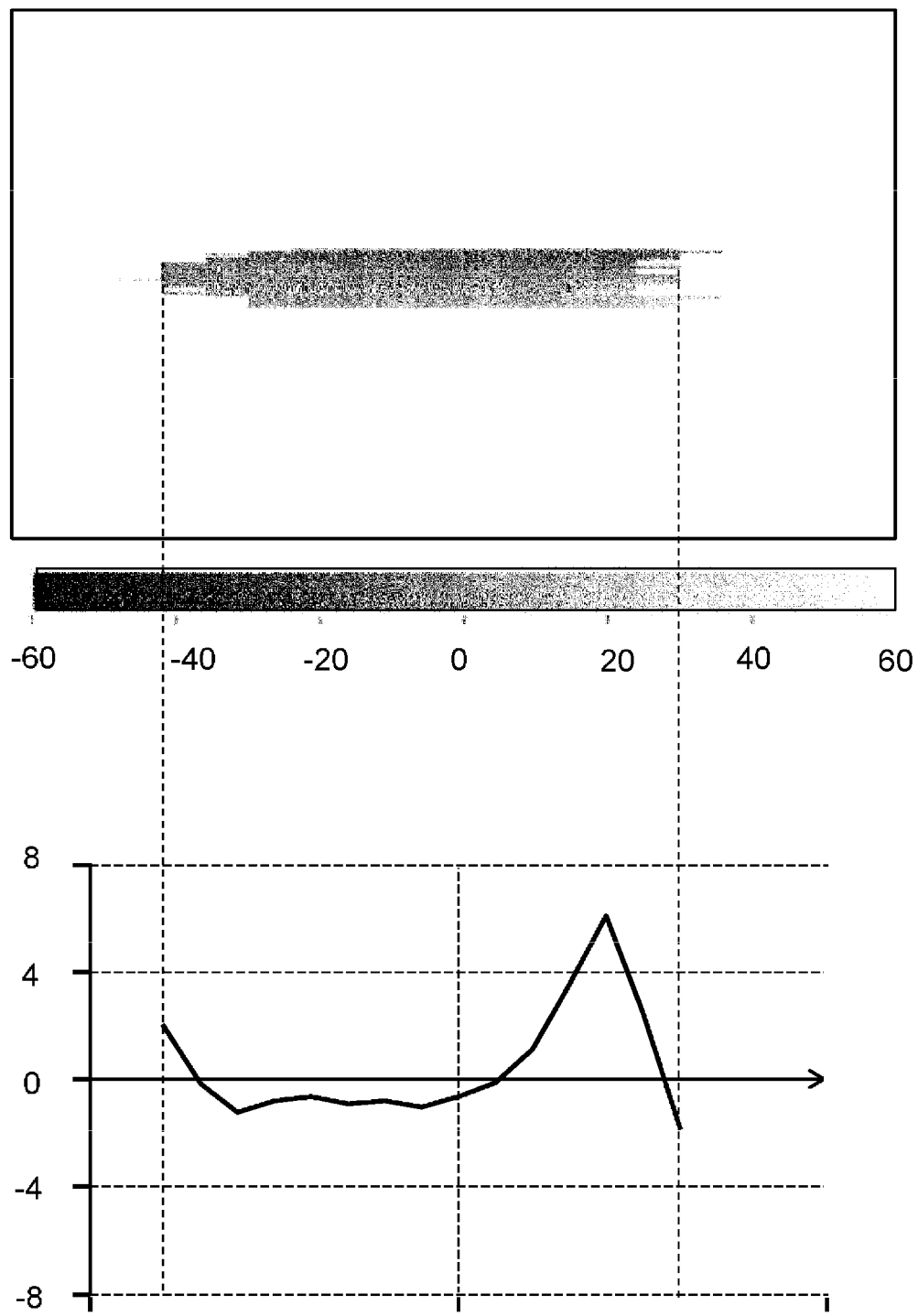

[FIG. 18]
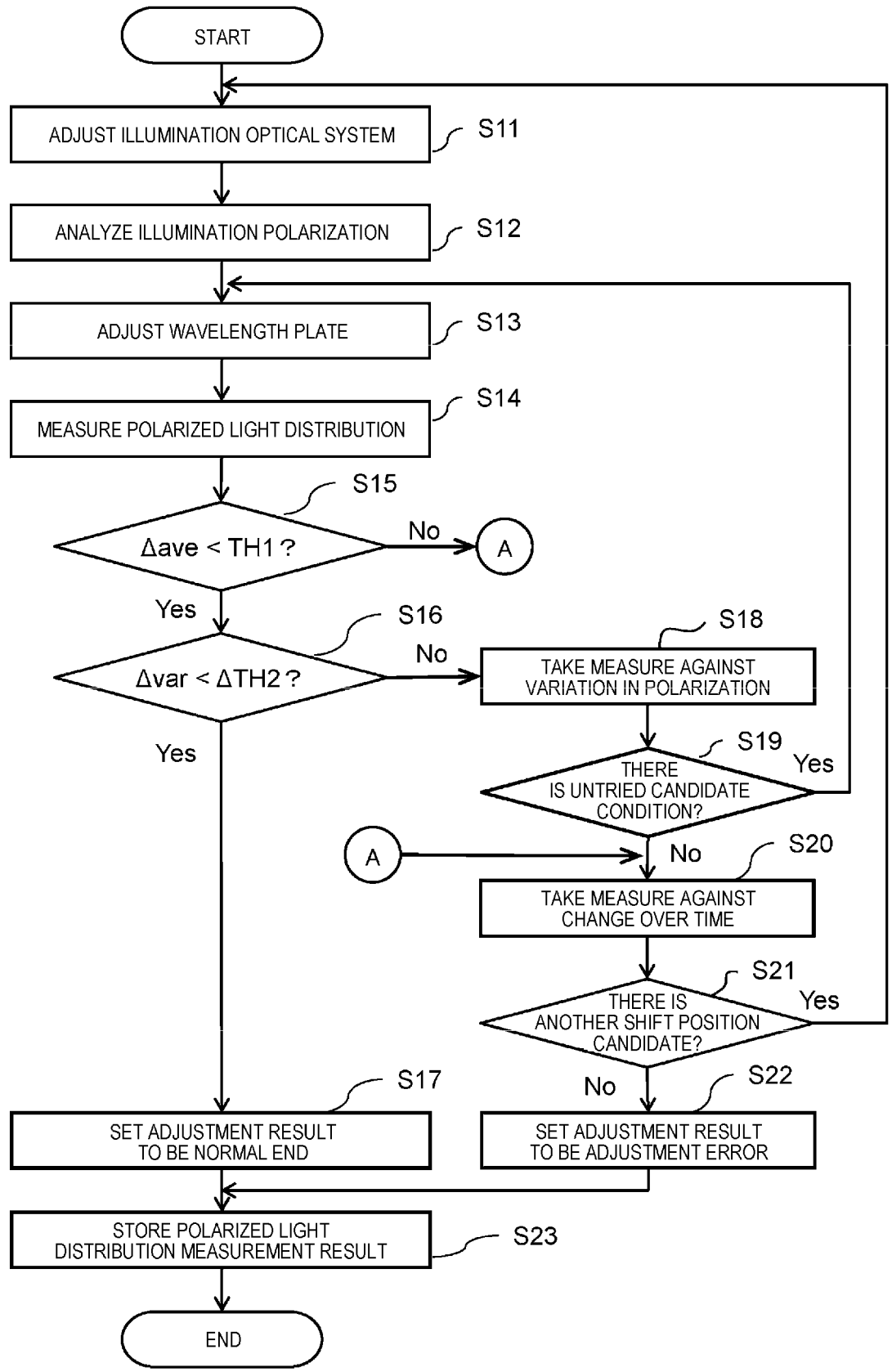

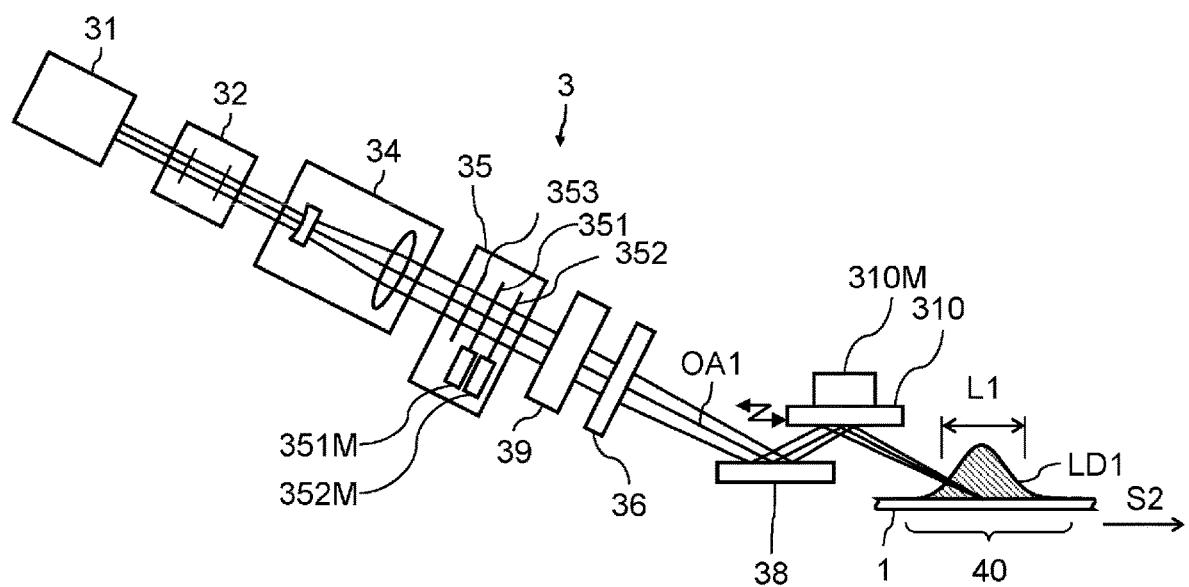
[FIG. 19]

[FIG. 20A]
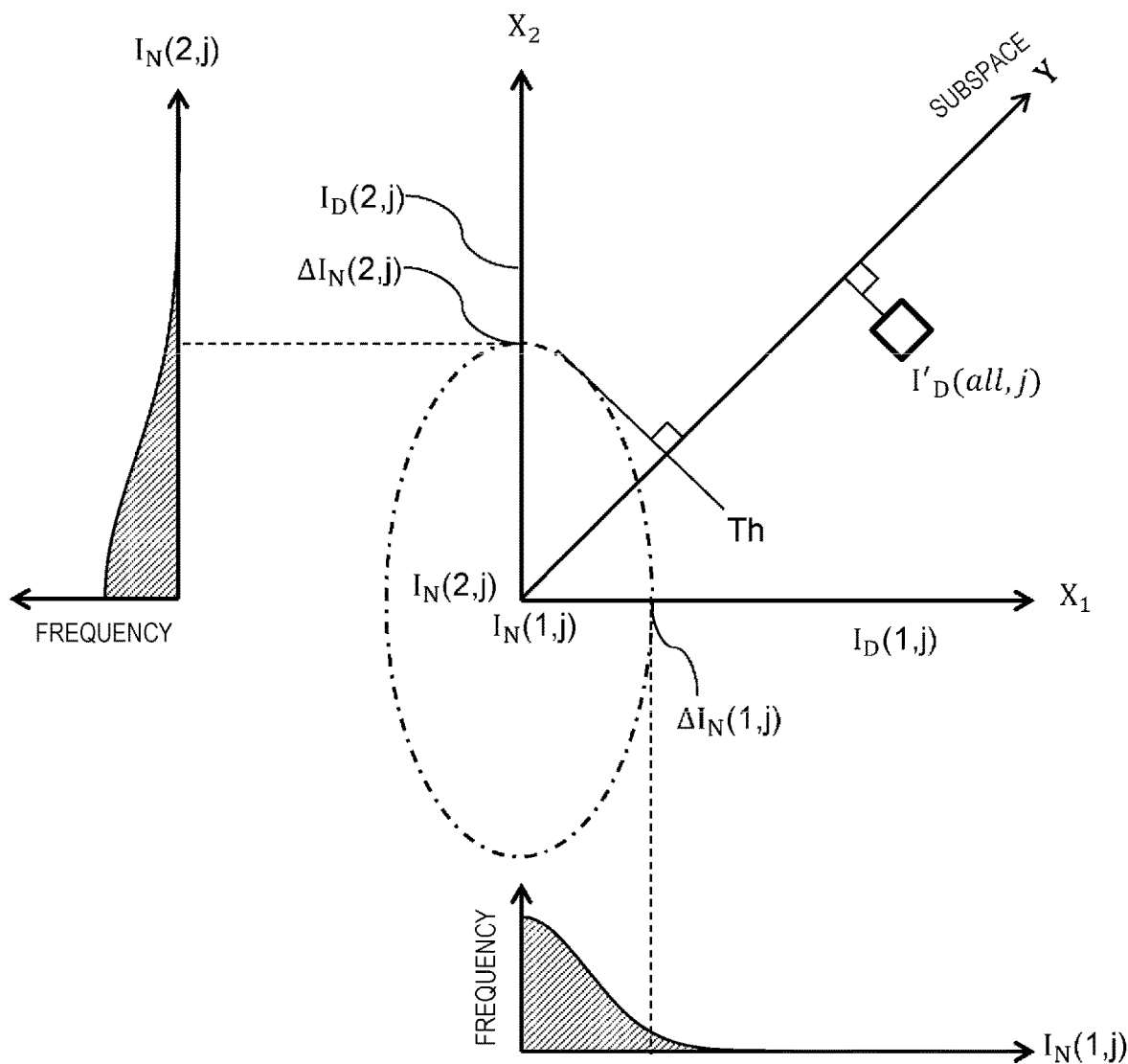

[FIG. 20B]
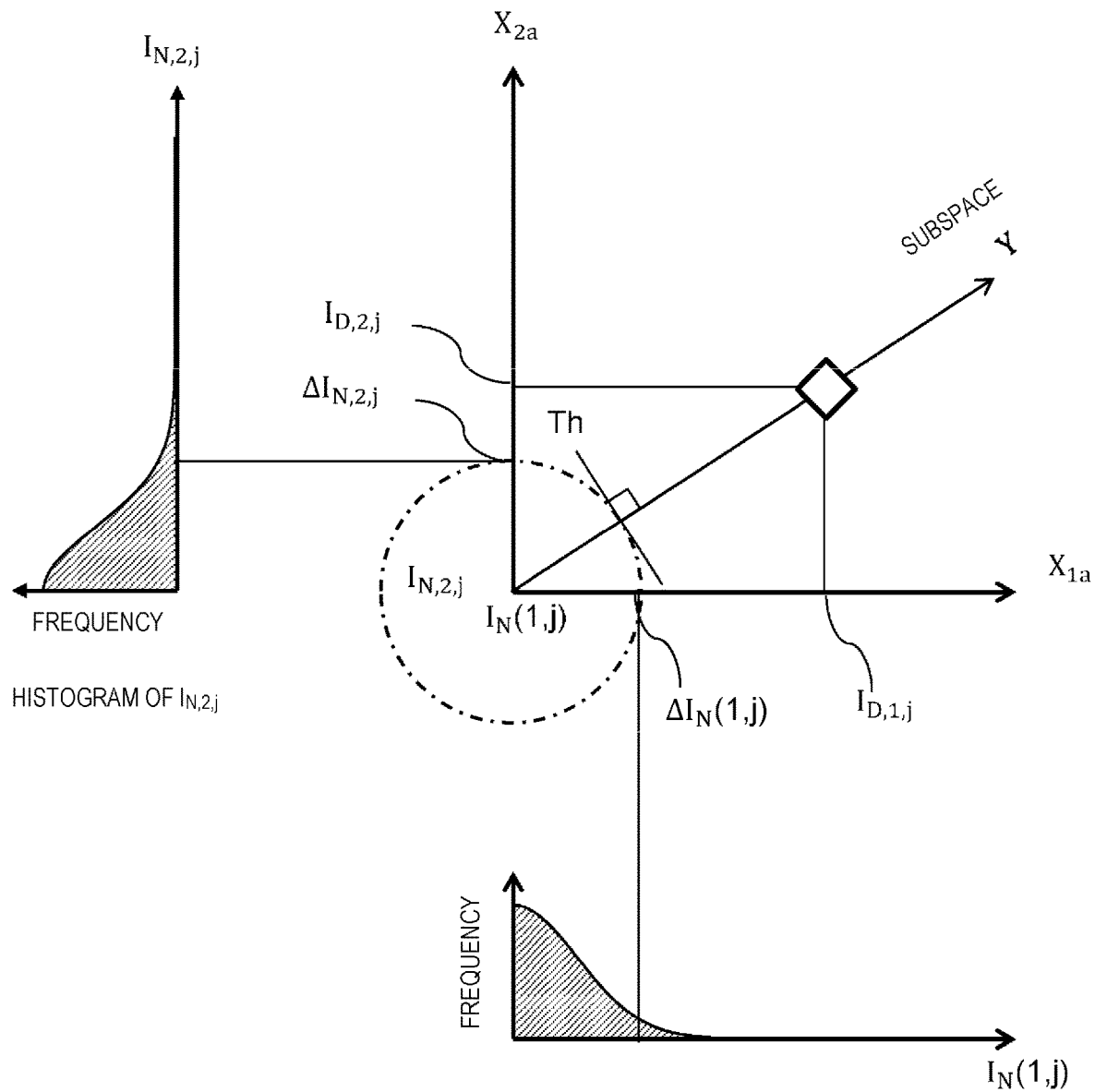

DEFECT INSPECTION DEVICE, DEFECT INSPECTION METHOD, AND ADJUSTMENT SUBSTRATE

TECHNICAL FIELD

The present invention relates to a defect inspection device, a defect inspection method, and an adjustment substrate.

BACKGROUND ART

In a manufacturing process for a semiconductor, a flat panel display, or the like, a defect on a surface of a substrate to be a product is inspected in order to maintain or improve a yield of the product. In order to optically detect a minute defect, it is necessary to perform detection by a sensor in such a manner that illumination light is emitted to the substrate and a small amount of scattered light generated by the defect is captured as much as possible whereas an amount of scattered light generated as noise from a surface of the substrate at the same time is minimized. Therefore, it is effective to irradiate the substrate with specific illumination such as p-polarized light, s-polarized light, or circularly polarized light.

In order to reduce a change over time in detection sensitivity of a defect inspection device used for defect inspection and reduce a variation (machine error) in detection sensitivity among a plurality of individual defect inspection devices of the same type, it is necessary to adjust polarization of illumination light with high accuracy to reduce an error.

PTL 1 discloses that "a wafer 20 to be inspected is irradiated with a perpendicular incident light 22 and/or an inclined incident light 24" and "two types of incident polarized light S and P are used".

CITATION LIST

Patent Literature

PTL 1: JP2013-238600A

SUMMARY OF INVENTION

Technical Problem

In the technique described above, it is disclosed that an object to be inspected is irradiated with illumination light at an inclined angle, and incident polarization of the illumination light is s-polarization or p-polarization. However, there is no description of a method for adjusting the incident polarization of the illumination light with respect to the object to be inspected. In addition, there is no description of a method for measuring a distribution of the incident polarization on the object to be inspected.

An object of the invention is to provide a method for measuring and adjusting polarization of illumination light emitted to a sample to be inspected with high accuracy with reference to a normal line direction of a surface of the sample, and to provide a method for measuring and adjusting a distribution of polarization in an irradiation area on the sample surface with high accuracy.

Therefore, an object of the invention is to provide a defect inspection device and a defect inspection method by which polarization of illumination light emitted to a sample to be inspected can be measured and adjusted with high accuracy with reference to a normal line direction of a surface of the sample.

Solution to Problem

In order to implement the above object, a defect inspection device according to the invention includes: an illumination optical system including a polarization element configured to switch polarization of irradiation light between first polarization and second polarization orthogonal to the first polarization; an anisotropic pattern substrate configured to emit diffraction light of a specific order of the irradiation light in a direction along a normal line of a sample stage surface, a diffraction efficiency of the specific order of the first polarization of the irradiation light being equal to or less than 20% of a diffraction efficiency of the specific order of the second polarization, the anisotropic pattern substrate being settable at a light collection position of the irradiation light on the sample stage surface and having an anisotropic pattern whose period is equal to or less than twice a wavelength of the irradiation light; an imaging element configured to collect the diffraction light of the specific order emitted from an irradiation position of the irradiation light to form an optical image; an observation image detector configured to detect the optical image formed by the imaging element; and a control unit configured to control the polarization element in such a manner that an intensity in a set area of an intensity distribution of the optical image detected by the observation image detector is within a set range.

A defect inspection method according to the invention includes: a procedure of collecting laser light from an angle inclined with respect to a normal line of a sample stage surface to an irradiation position on the sample stage surface to emit irradiation light; a procedure of enabling switching, by a polarization element provided in an illumination optical system, polarization of the irradiation light between first polarization and second polarization orthogonal to the first polarization; a procedure of emitting diffraction light of a specific order of the irradiation light in a direction along the normal line of the sample stage surface, a diffraction efficiency of the specific order of the first polarization of the irradiation light being equal to or less than 10% of a diffraction efficiency of the specific order of the second polarization, the diffraction light being emitted by an anisotropic pattern substrate that is settable at a light collection position of the irradiation light on the sample stage surface and that includes an anisotropic pattern whose period is equal to or less than twice a wavelength; a procedure of collecting, by an imaging element, the diffraction light of the specific order emitted from an irradiation position of the irradiation light to form an optical image; a procedure of detecting, by an observation image detector, the optical image formed by the imaging element; and a procedure of controlling the polarization element in such a manner that an intensity in a set area of an intensity distribution of the optical image detected by the observation image detector is within a set range.

An adjustment substrate according to the invention is an adjustment substrate to be set on a sample stage surface of a defect inspection device. The adjustment substrate includes an anisotropic pattern of a line-and-space pattern. A repetition period P of the line-and-space pattern is within ±20% of a value obtained by dividing a wavelength A of irradiation light of the defect inspection device by a sine function of an incidence angle θ, and a height of the line-and-space pattern is approximately ½ times the wavelength λ of the irradiation light.

Other means will be described in embodiments of the invention.

Advantageous Effects of Invention

According to the invention, it is possible to measure and adjust polarization of illumination light emitted to a sample to be inspected with high accuracy with reference to a normal line direction of a surface of the sample.

BRIEF DESCRIPTION OF DRAWINGS

FIG. 1 is a schematic view showing a configuration example of a defect inspection device according to an embodiment.

FIG. 2 is a schematic view showing a scanning trajectory of a sample scanned by a scanning unit of the defect inspection device.

FIG. 3 is a schematic view showing another example of the scanning trajectory of the sample.

FIG. 4 is a schematic view showing an attenuator.

FIG. 5 is a schematic view showing a relationship between an optical axis and an illumination intensity distribution shape of illumination light guided from an oblique direction to a sample surface by an illumination optical system in the defect inspection device.

FIG. 6 is a schematic view showing the relationship between the optical axis and the illumination intensity distribution shape of the illumination light guided from the oblique direction to the sample surface by the illumination optical system in the defect inspection device.

FIG. 7 is a schematic view showing a configuration of a detection optical system (inclination optical system) and an imaging sensor provided in the defect inspection device.

FIG. 8 is a schematic view showing the configuration of the detection optical system (inclination optical system) and the imaging sensor provided in the defect inspection device.

FIG. 9 is a schematic view showing a configuration of a detection optical system (vertical optical system) provided in the defect inspection device.

FIG. 10 is taken along a line X-X in the detection optical system (vertical optical system).

FIG. 11 is an explanatory view showing a principle of measuring a sample surface height variation by a height measurement unit.

FIG. 12 is a schematic view showing a three-dimensional arrangement of a sample and an inclination optical system.

FIG. 13 is an explanatory diagram showing a principle for measuring a polarization distribution of an illumination spot using a polarization diffraction grating and a detection optical system.

FIG. 14 is a schematic view showing a method for measuring the polarization distribution of the illumination spot using the polarization diffraction grating.

FIG. 15 is a schematic view showing a cross-section in the vicinity of a surface of a partial area of the polarization diffraction grating.

FIG. 16A is a graph showing pattern height dependence of a diffraction efficiency of the polarization diffraction grating.

FIG. 16B is a partially enlarged view of a graph showing the pattern height dependence of the diffraction efficiency of the polarization diffraction grating.

FIG. 16C is a graph showing pattern height dependence of a ratio of a diffraction efficiency of p-polarization to a diffraction efficiency of s-polarization for each pattern duty ratio.

FIG. 17A is a graph showing an illumination intensity distribution in the illumination spot.

FIG. 17B is a graph showing an s-polarization mixing ratio in the illumination spot.

FIG. 17C is a graph showing a polarization major axis angle in the illumination spot.

FIG. 18 is a flowchart showing a procedure of polarization adjustment based on polarization distribution measurement using the polarization diffraction grating.

FIG. 19 is an explanatory diagram showing a method for coping with a change over time in an optical element of the illumination optical system.

FIG. 20A shows a principle for improving an SN ratio of an integrated signal and determining a defect by signal addition without weighting.

FIG. 20B shows a principle of improving an SN ratio of an integrated signal and determining a defect by weighted signal addition.

DESCRIPTION OF EMBODIMENTS

Hereinafter, an embodiment of the invention will be described in detail with reference to the drawings. FIG. 1 is a schematic view showing a configuration example of a defect inspection device 100 according to the embodiment. The defect inspection device 100 according to the embodiment detects a defect such as a foreign substance or a recess on a surface (hereinafter, referred to as a sample surface) of a sample 1 that is an object to be inspected, in particular, detects a defect of a type according to an inspection purpose. A typical example of the sample 1 is a circular plate-shaped semiconductor silicon wafer having a flat surface on which no pattern is formed. The defect inspection device 100 includes a stage ST, an illumination optical system 3, detection optical systems 4-0, 4-1, 4-2, . . . , imaging sensors 5-0, 5-1, 5-2, . . . , a height measurement unit 8, a signal processing device 6, a control device 71, a user interface 72 such as a mouse and a keyboard, and a monitor 73 that is a display unit.

The signal processing device 6 and the control device 71 are computers equipped with a central processing unit (CPU) and a memory and control a focus actuator (an actuator 9 to be described later in the embodiment) according to an output of the height measurement unit 8. The signal processing device 6 and the control device 71 may be implemented by different computers or may be implemented by a single computer.

The stage ST includes a sample stage ST1 and a scanning device ST2. The sample stage ST1 is a stage that supports the sample 1. The scanning device ST2 is a device that drives the sample stage ST1 to change a relative position between the sample 1 and the illumination optical system 3 and includes a translation stage, a rotation stage, and a Z-stage. The rotation stage is supported by the translation stage via the Z-stage, and the sample stage ST1 is supported by the rotation stage. The translation stage is translated in a horizontal direction together with the rotation stage. The rotation stage rotates about an axis extending in an upper-lower direction. The Z-stage functions to adjust a height of the sample surface. In FIG. 1, a Z-direction is an upper side on paper, an X-direction is a right side on paper, and a Y-direction is a front side on paper.

FIG. 2 is a schematic view showing a scanning trajectory of the sample 1 scanned by the scanning device ST2. As will be described later, an illumination spot 40 emitted onto the sample surface by illumination light emitted from the illumination optical system 3 has an illumination intensity distribution elongated in one direction as shown in FIG. 2. A major-axis direction of the illumination spot 40 (a radial direction of the sample stage ST1) is defined as a direction S2, and a direction (a circumferential direction around a rotation axis of the sample stage ST1) substantially orthogonal to the major axis is defined as a direction S1. An arrow in FIG. 2 indicates the scanning trajectory of the sample 1.

Along with the rotation of the rotation stage, the sample 1 rotates, and the illumination spot 40 scans in the direction S1 relative to the sample surface. In addition, the sample 1 moves in the horizontal direction along with the translation of the translation stage, and the illumination spot 40 scans in the direction S2 relative to the sample surface. When the sample 1 is translated while being rotated by an operation of the scanning device ST2, the illumination spot 40 moves along a spiral trajectory from a center to an outer edge of the sample 1 as shown in FIG. 2, and the entire surface of the sample 1 is scanned. The illumination spot 40 moves in the direction S2 by a distance equal to or less than a length of the illumination spot 40 in the direction S2 during one rotation of the sample 1.

A configuration in which another translation stage whose movement axis extends in a direction intersecting a movement axis of the translation stage in a horizontal plane is provided instead of the rotation stage may be applied to the scanning device ST2. In this case, as shown in FIG. 3, the illumination spot 40 scans the sample surface along a folded linear trajectory instead of the spiral trajectory. An arrow in FIG. 3 indicates the scanning trajectory of the sample 1.

The arrow in FIG. 3 indicates that a first translation stage is translated in the direction S1 at a constant speed, a second translation stage is driven in the direction S2 by a predetermined distance (for example, a distance equal to or less than the length of the illumination spot 40 in the direction S2), and then the first translation stage is returned and translated in the direction S1 again. In this way, the illumination spot 40 repeats linear scanning in the direction S1 and movement in the direction S2, thereby scanning the entire surface of the sample 1. As compared with this scanning method, the spiral scanning method shown in FIG. 2 involves no reciprocating operation and is advantageous in performing inspection of the sample 1 in a short time.

Referring back to FIG. 1, the description will be continued. The illumination optical system 3 shown in FIG. 1 is an optical unit including a plurality of optical elements for emitting desired illumination light to the sample 1 placed on the sample stage ST1 and forms the illumination spot 40 having the major axis and elongated in one direction (direction S2) on the sample surface.

As shown in FIG. 1, the illumination optical system 3 includes a laser light source 31, an attenuator 32, an emission light adjustment unit 33, a beam expander 34, a polarization control unit 35, an anamorphic beam expander 39, a cylindrical lens 36, an anamorphic light collection mirror 310, reflection mirrors 371, 372, and 38, and the like.

The laser light source 31 is a unit that emits a laser beam as illumination light. A diameter of the laser beam emitted from the laser light source 31 is typically about 1 mm. When a minute defect in the vicinity of the sample surface is to be detected by the defect inspection device 100, a light source that oscillates a high-output laser beam having an output of 2 W or more in ultraviolet or vacuum ultraviolet with a small wavelength (for example, a wavelength of 355 nm or smaller) that is difficult to penetrate into the sample 1 is used as the laser light source 31. In the embodiment, for example, a laser beam having a wavelength of 266 nm is applied, and a laser beam having a wavelength corresponding to a purpose can be used from near-ultraviolet having a wavelength of 200 nm to 380 nm or vacuum ultraviolet having a wavelength of 10 nm to 200 nm. In addition, when a defect inside the sample 1 is to be detected by the defect inspection device 100, a light source that oscillates a visible or infrared laser beam with a large wavelength that easily penetrates into the sample 1 is used as the laser light source 31.

FIG. 4 is a schematic view showing the attenuator 32 in a state of being extracted.

The attenuator 32 is a unit that attenuates a light intensity of the illumination light from the laser light source 31, and in the embodiment, a configuration is shown in which a first polarization plate 321, a half-wavelength plate 322, and a second polarization plate 323 are combined. The half-wavelength plate 322 is rotatable about an optical axis of the illumination light. The illumination light incident on the attenuator 32 is converted into linearly polarization by the first polarization plate 321 and then passes through the second polarization plate 323 after a polarization direction thereof is adjusted to a slow-axis azimuth angle of the half-wavelength plate 322. By adjusting the azimuth angle of the half-wavelength plate 322, the light intensity of the illumination light can be attenuated at any ratio. When a linear polarization degree of the illumination light incident on the attenuator 32 is sufficiently high, the first polarization plate 321 may be omitted. As the attenuator 32, an attenuator whose relationship between an input signal and an attenuation ratio is calibrated in advance is used.

The attenuator 32 is not limited to the configuration shown in FIG. 4 and may be implemented using a neutral-density (ND) filter having a gradation density distribution. In this case, the light intensity of the illumination light can be attenuated at any ratio by a combination of a plurality of ND filters having different densities.

Referring back to FIG. 1, the description will be continued. The emission light adjustment unit 33 shown in FIG. 1 is a unit that adjusts an angle of the optical axis of the illumination light attenuated by the attenuator 32 and includes a plurality of reflection mirrors 331 and 332 in the embodiment. The illumination light is sequentially reflected by the reflection mirrors 331 and 332, and in the embodiment, an incidence and emission plane of the illumination light with respect to the reflection mirror 331 is orthogonal to an incidence and emission plane of the illumination light with respect to the reflection mirror 332.

The incidence and emission plane is a plane including an optical axis of light incident on a certain reflection mirror and an optical axis of light emitted from the reflection mirror. For example, when a three-dimensional XYZ orthogonal coordinate system different from the XYZ coordinate system in FIG. 1 is defined and the illumination light is incident on the reflection mirror 331 in a +X-direction, for example, the illumination light is deflected in a +Y-direction by the reflection mirror 331 and then deflected in a +Z-direction by the reflection mirror 332. This is an example in which an incidence and emission plane of the illumination light with respect to the reflection mirror 331 is an XY plane, and an incidence and emission plane with respect to the reflection mirror 332 is a YZ plane.

The reflection mirrors 331 and 332 are provided with mechanisms (not shown) for translating and tilting the reflection mirrors 331 and 332. For example, the reflection mirrors 331 and 332 are each moved parallelly in an incidence direction or an emission direction of the illumination light with respect to the reflection mirrors 331 and 332, respectively, and are tilted around a normal line of the incidence and emission surface. Accordingly, for example, with respect to the optical axis of the illumination light emitted in the +Z-direction from the emission light adjustment unit 33, an offset amount and an angle in an XZ plane and an offset amount and an angle in the YZ plane can be independently adjusted. In the embodiment, a configuration using the two reflection mirrors 331 and 332 is exemplified, and a configuration using three or more reflection mirrors may also be used.

The beam expander 34 is a unit that enlarges a luminous flux diameter of the incident illumination light and includes a plurality of lenses 341 and 342. An example of the beam expander 34 is a Galilean-type beam expander using a concave lens as the lens 341 and a convex lens as the lens 342. The beam expander 34 includes a mechanism (zoom mechanism) for adjusting an interval between the lenses 341 and 342, and a magnification ratio of the luminous flux diameter is changed by adjusting the interval between the lenses 341 and 342.

The magnification ratio of the luminous flux diameter enlarged by the beam expander 34 is, for example, 2 times to 5 times. In this case, if a beam diameter of the illumination light emitted from the laser light source 31 is 1 mm, the beam diameter of the illumination light is enlarged to about 2 mm to 5 mm. When the illumination light incident on the beam expander 34 is not a parallel luminous flux, collimation (quasi-parallelization of the luminous flux) is also possible together with the luminous flux diameter by adjusting the interval between the lenses 341 and 342. However, the luminous flux may be collimated by providing a collimation lens upstream of the beam expander 34 and separately from the beam expander 34.

The beam expander 34 is provided on a translation stage having two axes (two degrees of freedom) or more and is capable of performing position adjustment such that a center thereof coincides with the incident illumination light. In addition, the beam expander 34 also has a tilt angle adjustment function of two axes (two degrees of freedom) or more such that an optical axis thereof coincides with the incident illumination light.

The anamorphic beam expander 39 is a unit that expands the luminous flux diameter of the illumination light in one direction. Examples of the anamorphic beam expander 39 include an anamorphic prism pair obtained by combining a plurality of prisms and a cylindrical beam expander obtained by combining a plurality of cylindrical lenses. By the anamorphic beam expander 39, the beam diameter of the illumination light in a direction corresponding to the S1 direction on the sample 1 is enlarged by about 3 times to 15 times and becomes about 15 mm to 30 mm.

The polarization control unit 35 is an optical system that controls a polarization state of the illumination light and includes a half-wavelength plate 351 and a quarter-wavelength plate 352. For example, when oblique-incidence illumination is performed by inserting the reflection mirror 371 to be described later into an optical path, an amount of scattered light from a defect on the sample surface is increased by setting the illumination light to p-polarization by the polarization control unit 35 as compared to polarization other than the p-polarization. When scattered light (referred to as "haze") from minute irregularities on the surface of the sample hinders detection of a minute defect, the haze can be reduced by setting the illumination light to s-polarization as compared with polarization other than s-polarization. It is also possible to use the polarization control unit 35 to change the illumination light to circularly polarization or 45° polarization between p-polarization and s-polarization.

The cylindrical lens 36 is a unit that collects the illumination light in the direction S2 on the sample 1 to adjust a dimension of the illumination spot 40 in a longitudinal direction.

The anamorphic light collection mirror 310 is a unit that has a curvature in a direction corresponding to the direction S1 on the sample 1 and collects the illumination light in the direction S1 on the sample 1 to adjust the dimension of the illumination spot 40 in a short direction. The anamorphic light collection mirror 310 is a light collection element that collects laser irradiation light from an angle inclined with respect to a normal line of a sample stage surface to an irradiation position on the sample stage surface. The anamorphic light collection mirror 310 has no curvature in a direction orthogonal to the direction S1 on the sample 1. A curved surface shape of the anamorphic light collection mirror 310 in the direction S1 on the sample 1 is aspheric in order to prevent spherical aberration, and specifically, the curved surface is a parabolic surface optimal for collecting collimated incident light.

As shown in FIG. 1, the reflection mirror 371 is moved parallelly in the direction of the arrow by a drive mechanism (not shown) to enter and exit from an optical path of the illumination light traveling toward the sample 1 and can switch an incident path of the illumination light with respect to the sample 1. By inserting the reflection mirror 371 into the optical path, the illumination light emitted from the polarization control unit 35 is reflected by the reflection mirror 371, and is obliquely incident on the sample 1 via the anamorphic beam expander 39, the cylindrical lens 36, the reflection mirror 38, and the anamorphic light collection mirror 310. On the other hand, when the reflection mirror 371 is removed from the optical path, the illumination light emitted from the polarization control unit 35 is perpendicularly incident on the sample 1 via the reflection mirror 372, a polarization beam splitter 48, a polarization control unit 47, a reflection mirror 46, and the detection optical system 4-0.

FIGS. 5 and 6 are schematic views showing a relationship between an optical axis OA1 and an illumination intensity distribution shape of the illumination light guided from an oblique direction to the sample surface by the illumination optical system 3. FIG. 5 schematically shows a cross-section of the sample 1 taken along an incidence plane of the illumination light incident on the sample 1. FIG. 6 schematically shows a cross-section of the sample 1 taken along a plane that is orthogonal to the incidence plane of the illumination light incident on the sample 1 and includes a normal line of the sample surface. The incidence plane is a plane including the optical axis OA1 of the illumination light incident on the sample 1 and the normal line of the sample surface. In FIGS. 5 and 6, a part of the illumination optical system 3 is extracted and shown, and for example, the emission light adjustment unit 33 and the reflection mirrors 371, 372, and 38 are not shown.

When the reflection mirror 371 is inserted into the optical path, the illumination light emitted from the laser light source 31 is collected by the cylindrical lens 36, adjusted to a desired intensity distribution, reflected by the reflection mirror 38, and obliquely incident on the sample 1. In this way, the illumination optical system 3 allows the illumination light to be incident on the sample 1 from a direction inclined with respect to the normal line of the sample surface. During this oblique-incidence illumination, the light intensity is adjusted by the attenuator 32, the luminous flux diameter is adjusted by the beam expander 34, the polarization is adjusted by the polarization control unit 35, and the intensity distribution is adjusted by the cylindrical lens 36 such that the illumination intensity distribution is adjusted to a Gaussian distribution in the incidence plane. As in an illumination intensity distribution (illumination profile) LD1 shown in FIG. 5, the illumination spot 40 formed on the sample 1 has a Gaussian illumination intensity distribution in the direction S2. A beam width L1 in the direction S2 defined by 13.5% of a peak is, for example, about 25 μm to 800 μm.

In a plane orthogonal to the incidence plane and the sample surface, the illumination spot 40 has a light intensity distribution in which a peripheral intensity is weaker than that at a center of the luminous flux as in an illumination intensity distribution (illumination profile) LD2 shown in FIG. 6. Specifically, the light intensity distribution is a Gaussian distribution reflecting an intensity distribution of light incident on the anamorphic light collection mirror 310 or an intensity distribution similar to a first-order Bessel function of the first kind or a sinc function reflecting an aperture shape of the anamorphic light collection mirror 310.

A width L2 of the illumination intensity distribution in the plane orthogonal to the incidence plane and the sample surface is set to be smaller than the beam width L1 shown in FIG. 5 in order to reduce haze generated from the sample surface, and is set to, for example, about 1.5 μm to 10 μm. In order to make the width L2 smaller than the beam width L1, a numerical aperture (NA) of light collection in the direction S2 is larger than a numerical aperture in the direction S1. This is because an incident beam diameter collected in the direction S2 is expanded by the anamorphic beam expander 39 to a dimension larger than an incident beam diameter in the direction S1, and a focal length (an optical path length of a collected beam) is smaller in the direction S2 than in the direction S1. The width L2 of the illumination intensity distribution is a length of an area having an illumination intensity of 13.5% or more of a maximum illumination intensity in the plane orthogonal to the incidence plane and the sample surface.

An incidence angle (a tilt angle of an incident light axis with respect to the normal line of the sample surface) of the oblique-incidence illumination with respect to the sample 1 is adjusted, by positions and angles of the reflection mirrors 371 and 38, to an angle suitable for detecting a minute defect. The angle of the reflection mirror 38 is adjusted by an adjustment mechanism 381. For example, as the incidence angle of the illumination light with respect to the sample 1 becomes larger (as an illumination elevation angle that is an angle between the sample surface and the incident light axis becomes smaller), haze that is noise with respect to scattered light from a minute foreign matter on the sample surface becomes weaker, which is suitable for detection of the minute defect. From the viewpoint of reducing an influence of the haze on the detection of the minute defect, the incidence angle of the illumination light is preferably set to, for example, 75 degrees or more (at an elevation angle of 15 degrees or less). On the other hand, during the oblique-incidence illumination, as the illumination incidence angle decreases, an absolute amount of the scattered light from the minute foreign matter increases, and therefore, from the viewpoint of aiming to increase an amount of the scattered light from the defect, the incidence angle of the illumination light is preferably set to, for example, 60 degrees and more and 75 degrees or less (at an elevation angle of 15 degrees or more and 30 degrees or less).

Referring back to FIG. 1, the description will be continued. Each of the detection optical systems 4-0, 4-1, 4-2, . . . is an optical unit that collects scattered light of the illumination spot 40 from the sample surface, and includes a plurality of optical elements including a light collection lens (objective lens). The objective lenses of the detection optical systems 4-0, 4-1, 4-2, . . . are disposed along an upper half hemispherical surface of a sphere (celestial sphere) centered on the illumination spot 40 with respect to the sample 1. Scattered light incident on the detection optical systems 4-0, 4-1, 4-2, . . . are collected and guided to the corresponding imaging sensors 5-0, 5-1, 5-2, . . . . In the embodiment, an optical path of the scattered light incident on the detection optical system 4-0 is branched by the reflection mirror 46 and the scattered light is guided to an imaging sensor 5b in addition to the imaging sensor 5-0.

FIGS. 7 and 8 are schematic views showing a configuration of the detection optical systems 4-1, 4-2, . . . , and the imaging sensors 5-1, 5-2, . . . . That is, FIGS. 7 and 8 are schematic views showing the detection optical systems 4-1, 4-2, . . . whose optical axis is inclined with respect to the sample surface. FIG. 7 schematically shows a cross-section (a view seen in a −Y-direction in FIG. 1) obtained by cutting the detection optical systems 4-1, 4-2, . . . by a reflection plane on which the scattered light incident on the detection optical systems 4-1, 4-2, . . . is reflected by the sample 1. FIG. 8 is a schematic view of the detection optical systems 4-1, 4-2, . . . as viewed along the reflection plane from a direction intersecting the optical axis of the detection optical systems 4-1, 4-2, . . . (as viewed in a −Z-direction in FIG. 1).

The reflection plane is a plane including an optical axis OA2 of the scattered light incident on the detection optical systems 4-1, 4-2, . . . , and the normal line of the sample surface. Hereinafter, the detection optical systems 4-1, 4-2, . . . whose optical axis OA2 is inclined with respect to the sample surface and the imaging sensors 5-1, 5-2, . . . may be abbreviated as "detection optical system 4-1 . . . " and "imaging sensor 5-1 . . . ".

As shown in FIGS. 7 and 8, each of the detection optical system 4-1 . . . is a bilateral telecentric optical system implemented such that an imaging magnification does not change even when an operation distance changes. Each of the detection optical system 4-1 . . . includes, along the optical axis OA2, a light collection lens (objective lens) 411, a half-wavelength plate 412, a polarization beam splitter 42, a half-wavelength plate 431, cylindrical lenses 433 and 434, and an imaging lens 435. The illumination scattered light incident on the detection optical system 4-1 . . . is guided to the imaging sensor 5-1 . . . . Each of the detection optical system 4-1 . . . also includes a beam diffuser 44 in a traveling direction of light separated by the polarization beam splitter 42.

In the detection optical system 4-1 . . . , the light collection lens 411 collects the illumination scattered light, and the half-wavelength plate 412 controls a polarization direction thereof. The half-wavelength plate 412 is rotatable by an actuator (not shown).

An optical path of light passing through the half-wavelength plate 412 is branched by the polarization beam splitter 42 according to polarization. A combination of the half-wavelength plate 412 and the polarization beam splitter 42 facilitates separation between an optical signal indicating a defect of the sample 1 and an optical signal (roughness scattered light from the sample surface) inhibiting defect detection of the sample 1.

The light passing through the polarization beam splitter 42 is controlled by the half-wavelength plate 431 into a polarization direction suitable for detection by the imaging sensor 5-1 . . . . On the other hand, the light whose optical path is branched by the polarization beam splitter 42 is attenuated by the beam diffuser 44 so as not to become stray light.

A cross-sectional shape of the light passing through the half-wavelength plate 431 is adjusted by the cylindrical lenses 433 and 434. The cylindrical lenses 433 and 434 constitute a cylindrical beam expander, and a spread in a short direction γ of an optical image OI formed on a light-receiving surface of the imaging sensor 5-1 . . . is adjusted to be smaller than a spread in a longitudinal direction δ of the optical image OI. The light-receiving surface of the imaging sensor 5-1 . . . coincides with a position conjugate with the illumination spot 40 emitted onto the sample surface in the longitudinal direction δ, and is not necessarily conjugate with the illumination spot 40 in the short direction γ. However, since the short direction γ of the light-receiving surface coincides with the short direction of the optical image OI and an image height (width) in the short direction γ of the optical image OI is reduced by the cylindrical lenses 433 and 434, almost no defocus occurs in the short direction γ. A luminous flux whose cross-sectional shape is adjusted by the cylindrical lenses 433 and 434 in this manner is guided to the imaging sensor 5-1 . . . via the imaging lens 435, and the optical image OI of the illumination spot 40 is formed on a plurality of pixels of the imaging sensor 5-1 . . . . A detection signal of the optical image photoelectrically converted by each pixel of the imaging sensor 5-1 . . . is output to the signal processing device 6.

In this way, the detection optical systems 4-1, 4-2, . . . collect the scattered light of the illumination spot 40 emitted onto the sample 1 by the illumination optical system 3, control the polarization state of the incident scattered light, and form the optical image of the illumination spot 40 on the light-receiving surface of the corresponding imaging sensors 5-1, 5-2, . . . .

FIG. 9 is a configuration diagram of the detection optical system 4-0 on which scattered light emitted from the sample 1 in the normal line direction is incident, and FIG. 10 is a view taken along a line X-X in FIG. 9.

The detection optical system 4-0 includes a light collection lens (objective lens) 451 and an imaging lens 452, and guides, by the imaging lens 452, scattered light collected by the light collection lens 451 to the imaging sensor 5-0.

In the detection optical system 4-0, the reflection mirror 46 is disposed at a pupil position of the detection optical system 4-0 between the light collection lens 451 and the imaging lens 452. In the case of epi-illumination shown in FIG. 1 in which the reflection mirror 371 is removed from the optical path, the illumination light is incident on the sample 1 from the normal line direction via the reflection mirror 46. In this way, the light collection lens 451 of the detection optical system 4-0 also serves as a light collection lens that guides the epi-illumination to the sample 1.

On the other hand, the reflection mirror 46 serves to branch an optical path of a part of the scattered light incident on the detection optical system 4-0 from the illumination spot 40 by oblique-incidence illumination or epi-illumination. As described above, the illumination spot 40 has a linear intensity distribution elongated in the direction S2. As shown in FIG. 10, the reflection mirror 46 is longer than the illumination spot 40 in the direction S1 that is the short-axis direction of the linear illumination spot 40 when viewed from the imaging sensor 5-0, and is shorter than the illumination spot 40 in the direction S2 that is the major-axis direction of the illumination spot 40. Accordingly, the scattered light that is incident on the detection optical system 4-0 from the sample 1 and does not interfere with the reflection mirror 46 is incident on the imaging sensor 5-0 via the imaging lens 452, and the scattered light interfering with the reflection mirror 46 is reflected by the reflection mirror 46.

The scattered light that is incident on the detection optical system 4-0 from the sample 1 and that is reflected by the reflection mirror 46 is guided to the imaging sensor 5b via the polarization control unit 47, the polarization beam splitter 48, and an imaging lens 49. Similarly to the polarization control unit 35, the polarization control unit 47 includes a quarter-wavelength plate 471 and a half-wavelength plate 472 and can adjust the illumination scattered light incident from the reflection mirror 46 to desired polarization. The polarization control unit 47 corresponds to a polarization element capable of switching polarization of irradiation light between s-polarization (first polarization) and p-polarization (second polarization orthogonal to the first polarization). During oblique-incidence illumination, the polarization of the illumination scattered light incident on the polarization beam splitter 48 is controlled to become linearly polarization by the quarter-wavelength plate 471 of the polarization control unit 47 such that the illumination scattered light reflected by the reflection mirror 46 passes through the polarization beam splitter 48 and is incident on the imaging lens 49.

Referring back to FIG. 1, the description will be continued. The control device 71 controls the polarization of the illumination light by the polarization control unit 47 such that the illumination light traveling toward the sample 1 is incident on the detection optical system 4-0 as polarization in a desired direction (for example, circularly polarization) under the condition of the epi-illumination in which the reflection mirror 371 is removed from the optical path. The control device 71 functions as a control unit that controls the polarization control unit 47 such that an intensity in a set area of an intensity distribution of an optical image detected by an observation image detector is within a set range.

Instead of the imaging sensor 5-0, a sample surface sensor 5a can be set, by a drive mechanism (not shown), at a position of the imaging sensor 5-0 or a position conjugate with the imaging sensor 5-0 and is used for observing an enlarged image of the surface of the sample 1 projected by the detection optical system 4-0. The intensity distribution of the illumination spot 40 is measured by the sample surface sensor 5a, and position adjustment and focus adjustment of the illumination spot 40 are performed based on the intensity distribution. In order to measure a position, a width, and a length of the illumination spot 40 with high accuracy, a complementary metal-oxide-semiconductor (CMOS) area sensor or a charge-coupled device (CCD) area sensor having a pixel pitch smaller than that of the imaging sensor 5-0 is used as the sample surface sensor 5a. When imaging is performed by the sample surface sensor 5a, the reflection mirror 46 is retracted from the optical path by a drive mechanism (not shown) in order to prevent degradation of image resolving power.

The imaging sensors 5-0, 5-1, 5-2, . . . are lines each having a light-receiving surface on which a plurality of pixels are arranged in a row (array), and correspond to the detection optical systems 4-0, 4-1, 4-2, . . . , respectively. CMOS imaging elements or CCD imaging elements are used as the imaging sensors 5-0, 5-1, 5-2, . . . . The detection optical systems 4-0, 4-1, 4-2, . . . form the optical image OI of the illumination spot 40 on the light-receiving surfaces of the corresponding imaging sensors 5-0, 5-1, 5-2, . . . . The imaging sensors 5-0, 5-1, 5-2, . . . photoelectrically convert the optical image OI formed on the light-receiving surfaces and perform predetermined sampling, convert an analog electric signal into digital data, and output the digital data to the signal processing device 6 as a data set on a scattered light intensity of the optical image OI.

In the embodiment, the light-receiving surfaces of the imaging sensors 5-1, 5-2, . . . are inclined with respect to the optical axis OA2 according to inclination of the optical axis OA2 of the corresponding detection optical system 4-1, 4-2, . . . with respect to the sample surface, and a major axis of each light-receiving surface coincides with a position conjugate with the illumination spot 40 emitted onto the sample surface. However, the imaging sensor 5-0 facing the illumination spot 40 in the normal line direction of the sample surface is excluded. The light-receiving surface of the imaging sensor 5-0 is orthogonal to the optical axis OA2 of the detection optical system 4-0. The imaging sensors 5-1, 5-2, . . . are disposed such that the major axis (a center line extending in a longitudinal direction) of each light-receiving surface and a major axis of the optical image OI (FIG. 7) of the illumination spot 40 are parallel to each other and the entire illumination spot 40 is within a one-dimensional light-receiving surface formed by disposing pixels in an array.

In the defect inspection device 100 shown in FIG. 1, the actuator 9 for moving the imaging sensors 5-1, 5-2, . . . is provided for each of the imaging sensors 5-1, 5-2, . . . . As the actuator 9, for example, a piezoelectric actuator can be used, the corresponding sensor can be shifted with good response, and the corresponding sensor can be moved three-dimensionally, for example, parallelly. In the embodiment, the actuator 9 serves as a focus actuator that moves a focusing position of an optical image formed by the detection optical system corresponding to the actuator 9 relative to the light-receiving surface of the corresponding imaging sensor 5-1, 5-2, . . . .

A part of the scattered light collected by the detection optical system 4-0 is also guided to the imaging sensor 5b in addition to the imaging sensor 5-0. As the imaging sensor 5b, a two-dimensional CCD imaging element, a CMOS imaging element, or a position-sensing detector (PSD) is used. The imaging sensor 5b also performs photoelectric conversion on an optical image collected by the detection optical system 4-0, performs predetermined sampling, converts an electric signal into digital data by analog-to-digital conversion, and outputs the digital data to the signal processing device 6.

The height measurement unit 8 shown in FIG. 1 is a unit for measuring a height of the illumination spot 40 on the sample surface and includes a light collection lens 81, an imaging lens 82, and a two-dimensional sensor 83. As the two-dimensional sensor 83, a two-dimensional CCD imaging element, a CMOS imaging element, or a position-sensing detector (PSD) is used. The two-dimensional sensor 83 photoelectrically converts the optical image OI formed on the light-receiving surface by the light collection lens 81 and the imaging lens 82, converts an electric signal into digital data by analog-to-digital conversion and outputs the digital data to the control device 71. An output of the height measurement unit 8 may be input to the signal processing device 6 and input to the control device 71 via the signal processing device 6.

FIG. 11 is an explanatory diagram showing a principle for measuring a sample surface height variation by the height measurement unit 8 shown in FIG. 1. FIG. 11 shows a case where the sample 1 varies by Δn in the normal line direction of the sample surface. In FIG. 11, the light collection lens 81 is not shown.

Specular reflection light of the illumination light obliquely incident on the sample 1 at an elevation angle θ is incident on the two-dimensional sensor 83 via the imaging lens 82. Therefore, when the height of the sample 1 varies from a position indicated by a broken line to a position indicated by a solid line, a trajectory of the specular reflection light moves parallelly, and an incidence position of the specular reflection light on the two-dimensional sensor 83 changes. In the two-dimensional sensor 83, an electric signal from a pixel on which the specular reflection light is incident, that is, an electric signal corresponding to the incidence position of the specular reflection light is output from the two-dimensional sensor 83. An amount of height variation of the illumination spot 40 can be measured based on a deviation from the incidence position of the specular reflection light as a reference along with the height variation of the illumination spot 40 on the sample 1 with reference to the incidence position when the illumination spot 40 on the sample 1 is at a reference height (when the height variation Δn=0).

Specifically, when a deviation amount from the reference of the incidence position of the specular reflection light on the two-dimensional sensor 83 is x, a relationship of the following expression (1) is established as can be seen from FIG. 11.

[Math 1]

$$x = 2 \cdot \Delta n \cdot \cos\theta \qquad (1)$$

Based on this relational expression, the control device 71 can calculate the height variation Δn of the illumination spot 40 based on a value of x. It is needless to say that x is different from X in the XYZ coordinate system.

The signal processing device 6 shown in FIG. 1 is a computer that processes detection signals received from the imaging sensors 5b, 5-0, 5-1, . . . , and includes a CPU, a field-programmable gate array (FPGA), a timer, and the like in addition to a read-only memory (ROM), a random access memory (RAM) and other memories.

As an example, the signal processing device 6 is assumed to be implemented by a single computer forming a unit with a device main body (the stage, the illumination optical system, the detection optical system, the sensors, and the like) of the defect inspection device 100, and may also be implemented by a plurality of computers. In this case, a server may be used as one of the plurality of computers. This is an example in which the server is among constituent elements of the defect inspection device 100. For example, the computer attached to the device main body may acquire a defect detection signal from the device main body, detection data may be processed as necessary and transmitted to the server, and the server may execute processing such as defect detection and classification.

The signal processing device 6 includes an illumination spot position analysis circuit 61, a memory 62, a signal integration circuit 63, and a defect detection circuit 64. The illumination spot position analysis circuit 61, the signal integration circuit 63, and the defect detection circuit 64 are, for example, FPGA circuits or software programs.

The illumination spot position analysis circuit 61 analyzes the position of the illumination spot 40 based on digital data received from the imaging sensors 5b, 5-1, 5-2, . . . . The memory 62 stores the digital data received from the imaging sensors 5b, 5-1, 5-2, . . . , position data calculated by the illumination spot position analysis circuit 61, and the like, and accumulates the data as scattered light data. Based on the scattered light data stored in the memory 62, the signal integration circuit 63 integrates a plurality of pieces of scattered light data in which the positions of the illumination spot 40 output from the same sensor are different, and integrates scattered light data similarly integrated for different sensors. The defect detection circuit 64 extracts a portion of high frequency and high luminance on the sample surface as a defect based on the scattered light data after the integration. Each circuit of the signal processing device 6 can be implemented by, for example, an FPGA. In addition, at least a part of functions of the circuits (particularly, processing of downstream processes) can be executed by a graphics processing unit (GPU) or a CPU mounted on the server.

To describe the processing of the signal integration circuit 63, the signal integration circuit 63 sums up scattered light intensities in pieces of data scanned in the longitudinal direction of the linear illumination spot 40 of the sample 1 at the same coordinates on the sample surface. That is, in the case of spirally scanning the sample 1, when coordinates on the sample surface are expressed in an rθ coordinate system, scattered light intensities of the same coordinates in pieces of scattered light data having the same θ coordinate and different r coordinates are summed up. The r coordinate of the rθ coordinate system is a radial coordinate on the sample surface, and the θ coordinate is an azimuth angle coordinate on the sample surface, which is a concept different from the elevation angle θ in FIG. 11. Even when the pieces of scattered light data are output from the same sensor, for pieces of data having different r coordinates, an imaging position of the scattered light from the same coordinates (that is, a pixel receiving the scattered light from the same coordinates) is deviated by a movement amount of the sample stage ST1 during one rotation of the sample 1. Therefore, based on the movement amount of the sample stage ST1, a correspondence relationship of pixels of an output source of a signal to be summed up as the scattered light intensity at the same coordinates is calculated.

The control device 71 is a computer that collectively controls the defect inspection device 100, and includes a CPU, an FPGA, a timer, and the like in addition to a ROM, a RAM, and other memories, similarly to the signal processing device 6. The control device 71 is connected to the user interface 72, the monitor 73, and the signal processing device 6 in a wired or wireless manner.

The invention is not limited to this configuration. Alternatively, the function of the signal processing device 6 may be implemented on the control device 71, and the control device 71 may also serve as the signal processing device 6. The user interface 72 is a device through which a user inputs various operations, and various input devices such as a keyboard, a mouse, and a touch panel can be adopted as appropriate. As the monitor 73, various display devices such as a liquid crystal display can be adopted as appropriate.

Inspection conditions and the like received from the user interface 72 according to the output of the height measurement unit 8, encoders of the rotation stage and the translation stage, and an operation of an operator are input to the control device 71. The inspection conditions include, for example, a type, a size, a shape, a material, illumination conditions, and detection conditions of the sample 1.

Further, according to the height variation of the sample 1 and the inspection conditions, the control device 71 outputs, to the signal processing device 6, a signal for instructing an operation of the actuator 9, the detection optical systems 4-0, 4-1, . . . , the stage ST, and the illumination optical system 3, and outputs coordinate data on the illumination spot 40 synchronized with the detection signal of the defect. In addition, the control device 71 displays a result of the defect inspection performed by the signal processing device 6 on the monitor 73 to output the result.

FIG. 12 shows a schematic view of a three-dimensional arrangement of the sample 1 and an inclination optical system. The optical axis OA2 of the detection optical system 4-1 . . . is inclined by an angle θ with respect to the normal line (normal line direction n) of the sample 1. A projection of the optical axis OA2 on the sample surface is inclined by an angle φ with respect to the major axis (direction S2) of the illumination spot 40. In the specification of the application, θ described after this paragraph represents an inclination angle of the optical axis OA2 of the inclination optical system with respect to the normal line of the sample surface, and is a concept different from θ representing the elevation angle of the illumination light in FIG. 11 and θ of the above rθ coordinate system.

When the optical axis OA2 of the detection optical system 4-1 is inclined by the angle θ with respect to the normal line of the sample 1 and the projection of the optical axis OA2 on the sample surface is inclined by the angle φ with respect to the major axis of the illumination spot 40, a vector $v_0$ of the optical axis OA2 shown in FIG. 7 is expressed by the following expression (2) in a three-dimensional space.

[Math 2]

$$v_0 = (\sin\theta \cdot \sin\varphi, \sin\theta \cdot \cos\varphi \cdot \cos\theta) \quad (2)$$

An angle α formed by the vector $v_0$ and a vector $v_2$ (direction S2) of the major axis of the illumination spot 40 is obtained by an expression (3).

[Math 3]

$$\alpha = \arccos(\sin\theta \cdot \cos\varphi) \quad (3)$$

At this time, under a condition that the height of the sample surface is at the reference position, the optical image OI of the illumination spot 40 is within the light-receiving surface of the imaging sensor 5-1 . . . without correcting a position of the optical system or the sensor. At this time, assuming that a length of the major axis of the illumination spot 40 is 2 L, a difference of Δz shown in expression (4) is generated in an operation distance (a distance between the sample 1 and the detection optical system 4-1 . . . ) between a center of a field of view on the sample surface and a point away by a distance x from the center of the field of view.

[Math 4]

$$\Delta z = x(\sin\theta \cdot \cos\varphi), |x| < L \quad (4)$$

An imaging magnification M is determined by the light collection lens 411 and the imaging lens 435. When the imaging magnification M is used, a position of the optical image OI on the light-receiving surface of the imaging sensor 5-1 . . . at the point away by the distance x from the center of the field of view on the sample surface is expressed by the following expression (5).

[Math 5]

$$\Delta z = M^2 x(\sin\theta \cdot \cos\varphi), |x| < L \quad (5)$$

In general, a line sensor is disposed such that a light-receiving surface is orthogonal to a center line (optical axis) of a luminous flux emitted by an imaging lens. On the other hand, in the embodiment, as shown in FIG. 7, the light-receiving surface of the imaging sensor 5-1 . . . is inclined with respect to the optical axis OA2, and an optical image without defocus is detected regardless of the difference Δz in the operation distance generated in a field of view of the detection optical system 4-1 . . . that is the inclination optical system.

A vector $v_1$ of a major axis (a center line extending in a longitudinal direction) of the light-receiving surface shown in FIG. 7 is in the same plane as the vector $v_2$ (direction S2) of the major axis of the illumination spot 40 and the vector $v_0$ of the optical axis OA2 and is set such that an angle β with respect to the vector $v_0$ satisfies an expression (6).

[Math 6]

$$\tan \alpha = M \cdot \tan \beta \tag{6}$$

At this time, the angle α is an angle formed by the vectors $v_0$ and $v_2$, and a relationship of expression (7) is established.

[Math 7]

$$\cos \alpha = \sin \theta \cdot \cos \varphi \tag{7}$$

When the imaging magnification M increases, the angle β formed by the vectors $v_0$ and $v_1$ decreases from that in the expression (6), and an incidence angle of reflected light with respect to the imaging sensor 5-1 increases. When the imaging magnification M is increased to 2, scattered light is incident on the imaging sensor 5-1 at an incidence angle close to 90 degrees at maximum. However, transmittance of an antireflection film formed on the light-receiving surface of the imaging sensor 5-1 depends on an incidence angle of a light beam, and the transmittance decreases at the incidence angle close to 90 degrees and thus light-receiving sensitivity of the imaging sensor 5-1 decreases. Therefore, the imaging magnification M is preferably 2 times or less.

When polarization of illumination applied to a defect and a substrate surface changes, a scattered light intensity and polarization from the defect and the substrate surface change. Accordingly, defect detection performance changes since an intensity ratio of scattered light from the defect and the substrate surface detected by the imaging sensors 5-1, 5-2, . . . of the detection optical systems 4-0, 4-1, . . . changes.

The change in the polarization of the illumination occurs due to deterioration over time of an optical element of the illumination optical system 3 caused by long-time irradiation of laser light having a short wavelength and a high intensity. Due to the long-time irradiation of the laser light having the short wavelength and the high intensity, a member constituting the optical element in the illumination optical system 3 and a coating film on a surface thereof are damaged by heat or photon energy, or a trace amount of an organic substance in an atmosphere adheres to the surface. Such adhesion on the surface is called laser-induced contamination. This phenomenon changes birefringence (a polarization-dependent refractive index or transmittance) of the optical element, thereby changing the polarization of the illumination.

Since the change in the polarization described above is different depending on a path through which an illumination beam reaches the illumination spot 40 through a light beam, the change in the polarization is different depending on a position in the illumination spot 40. In this case, as a result, since the defect detection performance varies or fluctuates depending on a location in a detection field of view, it is necessary to detect the change in the polarization for each position in the illumination spot 40 to take measures. In a normal method for measuring a transmission intensity of a beam passing through a polarization plate, since an influence of a local change is buried in a change in an intensity of the entire beam, it is difficult to detect the change in the polarization at each position in the illumination spot 40.

FIG. 13 is a schematic view showing a principle and a configuration for measuring a distribution of polarization in the illumination spot 40 using a polarization diffraction grating 10 and the detection optical system 4-0.

When measuring the distribution of the polarization in the illumination spot 40, an adjuster places the polarization diffraction grating 10 on the sample stage surface of the stage ST and adjusts the stage ST such that a Z-position on a surface of the polarization diffraction grating 10 coincides with a light collection position in the illumination spot 40. The polarization diffraction grating 10 is an anisotropic pattern substrate whose surface includes a repeating pattern structure (anisotropic pattern structure) to be described later. Therefore, the polarization diffraction grating has the following properties for incident light whose incidence angle is in a specific narrow range including an incidence angle of an optical axis OA at which illumination light of oblique-incidence illumination is incident.

A first property is that first-order diffraction light is emitted in the normal line direction of the sample stage surface. A second property is that a first-order diffraction efficiency for incidence of s-polarization of a predetermined wavelength is 10 times or more, which is far higher, than a first-order diffraction efficiency for incidence of p-polarization of the predetermined wavelength.

According to the first property, first-order diffraction light from the illumination spot 40 of the polarization diffraction grating 10 is emitted in an optical axis direction of the detection optical system 4-0, and an intensity distribution of the illumination spot 40 is measured as an intensity distribution of a detection image detected by the sample surface sensor 5a of the detection optical system 4-0.

According to the second property, the polarization diffraction grating 10 acts as a polarizer having an extinction ratio of 10 times or more for the illumination light of the oblique-incidence illumination. Therefore, the intensity distribution of the detected image substantially corresponds to an intensity distribution of an s-polarization component in the illumination spot 40. Therefore, by adjusting the half-wavelength plate 351 and the quarter-wavelength plate 352 of the illumination spot 40 to maximize an intensity of each portion of the detected image, polarization of illumination light emitted to the portion can be brought close to s-polarization with respect to the surface of the polarization diffraction grating 10. In addition, by adjusting the half-wavelength plate 351 and the quarter-wavelength plate 352 of the illumination spot 40 to minimize the intensity of each portion of the detected image, the polarization of the illumination light emitted to the portion can be brought close to p-polarization with respect to the surface of the polarization diffraction grating 10.

FIG. 14 is a graph showing a method for measuring a polarization distribution of the illumination spot 40 using the polarization diffraction grating 10.

A vertical axis in the graph indicates a detection intensity, and a horizontal axis indicates a wavelength plate angle set value. Two pieces of data "position #1" and "position #2" in the drawing indicate detection intensities at the positions #1 and #2 different from each other in the illumination spot 40 when the half-wavelength plate 351 is adjusted. A broken line in the graph indicates a state in which an intensity of a sine wave is minimized when the wavelength plate angle set value is $\Delta\Psi_1/2$. A dash-dotted line indicates a state in which the intensity of the sine wave is minimized when the wavelength plate angle set value is $\Delta\Psi_2/2$.

By changing an angle of the half-wavelength plate 351, polarization incident on the illumination spot 40 rotates, and the detection intensity increases when the polarization at the position #1 and the position #2 approaches p-polarization, and the detection intensity decreases when the polarization approaches s-polarization. A relationship between an angle of the incident polarization and the detection intensity draws a sinusoidal waveform following the Malus law.

A state in which the intensity of the sine wave is maximized is estimated to be a state in which a major axis of the incident polarization coincides with s-polarization, and a state in which the intensity of the sine wave is minimized is estimated to be a state in which the major axis of the incident polarization coincides with p-polarization. By adjusting the half-wavelength plate 351 to minimize the intensity of the sine wave, the incident polarization is adjusted to p-polarization. Due to properties of the half-wavelength plate, an angle of the major axis of the incident polarization changes by an angle twice as large as a change amount of a set angle of the half-wavelength plate 351. Therefore, when the angle of the half-wavelength plate 351 is deviated by $\Delta\Psi/2$ from the state of minimum intensity, the incident polarization is estimated to be deviated by $\Delta\Psi$ from p-polarization.

Here, a state in which the incident polarization is adjusted to p-polarization is a state in which a ratio of an intensity of an s-polarization direction component orthogonal to a p-polarization direction component with regard to an intensity of the p-polarization direction component determined with reference to the surface of the polarization diffraction grating 10 (a mixing ratio of an s-polarization component) is minimized and includes a state of elliptical polarization or partial polarization in which an s-polarization component is mixed to a certain extent. Detection intensities ($I_{1min}$ and $I_{2min}$) in the state in which the intensity of the sine wave is minimized indicate components (s-polarization components orthogonal to p-polarization) other than p-polarization in the incident polarization in a state in which the major axis of the incident polarization coincides with the p-polarization and indicate transmitted light proportional to a reciprocal of the extinction ratio of the polarization diffraction grating 10. When the adjuster changes an angle of the half-wavelength plate 351 or the quarter-wavelength plate 352, a component other than p-polarization in the incident polarization can be adjusted. By minimizing the detection intensities ($I_{1min}$ and $I_{2min}$) by adjusting these angles, it is possible to minimize mixing of a polarization component (here, an s-polarization component) different from desired illumination polarization.

Since the half-wavelength plate 351 or the quarter-wavelength plate 352 acts in common on the positions #1 and #2 in the illumination spot 40, there remains a residual from p-polarization at the positions #1 and #2 in the illumination spot 40 after adjusting the angles. As an example, in FIG. 14, when the half-wavelength plate 351 is adjusted to an angle $\Psi 0$, a polarization major axis angle at the position #1 is deviated by $\Delta\Psi 1$ from p-polarization, and the polarization major axis angle at the position #2 is deviated by $\Delta\Psi 2$ from p-polarization. According to the method for measuring the distribution of the polarization in the illumination spot 40 using the polarization diffraction grating 10, the polarization state (a major axis azimuth angle and an intensity of a component other than p-polarization) at each position in the illumination spot 40 is measured, and thus polarization adjustment (adjustment of the half-wavelength plate 351 or the quarter-wavelength plate 352) of the illumination optical system 3 can be performed based on the measured state.

In order to obtain a maximum value, a minimum value, and horizontal axis values leading to these values from a sinusoidal curve in the graph shown in FIG. 14, an appropriate curve-fitting method may be used. For example, as a method with a small amount of calculation, it is effective to express a sine wave in a form as in an expression (8) and obtain the sine wave by linear regression (least-squares method) using variables A, B, and C as parameters.

[Math 8]

$$A \cos(2\pi x/90) + B \sin(2\pi x/90) + C \tag{8}$$

Here, x: wavelength plate angle set value

Alternatively, the sine wave may be expressed in a form as in an expression (9), and optimum values of the variables A, B, and C may be obtained by the least-squares method based on iterative calculation.

[Math 9]

$$A \sin(2\pi(x-B)/90) + C \tag{9}$$

Here, x: wavelength plate angle set value

In the embodiment, since it is important to accurately obtain a slight deviation of the polarization from p-polarization, only several points (3 points to 5 points) may be measured in the vicinity of an adjustment state of p-polarization known in advance by mechanically setting an angle or measurement in advance, and the minimum value and a wavelength plate angle set value x leading to the minimum value may be obtained by applying a quadratic function to data on the points by the least-squares method. This method has an advantage that the number of pieces of data to be acquired is small and thus the measurement is less time-consuming. Here, the quadratic function is used since the curve is approximated by the quadratic function in the vicinity of an inflection point of the sine wave, and there is an advantage that a calculation amount is less as compared with a method using the sine wave.

In the above measurement, by calculating a sum of intensities of two points sampled at an interval of half a period of the sinusoidal curve, a sum of a minimum intensity and a maximum intensity, or a value twice as large as an average value, a normal illumination intensity without considering polarization is obtained. The normal illumination intensity without considering polarization refers to an illumination intensity of all pieces of polarization including a polarization component and an unpolarization component.

FIG. 15 is a schematic view showing a cross-section in the vicinity of a surface of a partial area of the polarization diffraction grating 10.

The polarization diffraction grating 10 includes, on the surface thereof, a unidirectional repeating pattern created by a microfabrication method such as photolithography or electron beam direct writing. A repetition period P of a line-and-space pattern is a period in which first-order diffraction light is emitted in a normal line direction of a surface, that is, in the Z-direction with respect to oblique-incidence illumination by the illumination optical system 3. The repetition period P is a value obtained by an expression (10), in which $\theta i$ is an incidence angle of the oblique-incidence illumination and $\lambda$ is a wavelength of illumination light, and is practically within ±20% from a value obtained by dividing the wavelength $\lambda$ by a sine function of the incidence angle $\theta$ based on a principle of diffraction.

[Math 10]

$$P = \lambda/\sin\theta_i \quad (10)$$

Here, the period P is preferably at least equal to or less than twice the wavelength λ of the illumination light.

A pattern height H and a duty ratio are values that maximize the extinction ratio of the polarization diffraction grating 10 as the polarization plate, that is, a ratio of the diffraction efficiency of s-polarization to the diffraction efficiency of p-polarization.

FIGS. 16A to 16C are graphs showing simulation results representing a relationship between a pattern shape of the polarization diffraction grating 10 and the diffraction efficiency. A relationship between the diffraction efficiency, the pattern height H, and the duty ratio for each piece of incident polarization of the polarization diffraction grating 10 is obtained by simulation of a rigorous coupled-wave analysis (RCWA) method. As an example, λ=266 nm, θi=70 degrees, and P=283 nm.

FIG. 16A is a graph showing pattern height dependence of the diffraction efficiency. According to this graph, when the pattern height is changed, the diffraction efficiencies of p-polarization (P-pol) and s-polarization (S-pol) vary depending on different phases and amplitudes. Therefore, the ratio of the diffraction efficiency of p-polarization to that of s-polarization can be maximized or minimized by optimizing the pattern height.

FIG. 16B is an enlarged graph of the vicinity of a pattern height of 0.120 μm at which the ratio of the diffraction efficiency of s-polarization to that of p-polarization is maximized in FIG. 16A. U-pol represents unpolarization and takes an intermediate value between s-polarization and p-polarization. It can be seen from the graph that the diffraction efficiency of p-polarization is minimized when the pattern height is around 0.125 μm.

FIG. 16C is a graph showing, as a more detailed analysis, the pattern height dependence of the diffraction efficiency ratio of p-polarization to s-polarization for each pattern duty ratio. An approximate reciprocal of the diffraction efficiency ratio of p-polarization to s-polarization corresponds to the extinction ratio of the polarization diffraction grating 10 as the polarizer. From this graph, it can be seen that, when the duty ratio is in a range of 0.2 to 0.5 and the pattern height is 0.130 μm to 0.126 μm (an optimum value is different for each duty ratio), a polarization characteristic having a diffraction efficiency ratio equal to or less than 1/30 and an extinction ratio of 30.0 or more is obtained.

When the polarization diffraction grating 10 is manufactured with a period of about 280 nm and a pattern width of about 0.11 μm (at a duty ratio of 0.4) as targets, a processing dimension error of about several % is assumed due to limitation on processing accuracy of a fine pattern. However, even when the manufacturing error of the pattern width is temporarily ±10%, an error range of the duty ratio is 0.36 to 0.44, and performance of an extinction ratio of 20.0 or more is secured from the graph in FIG. 16B.

A material of a portion on which the pattern of the substrate of the polarization diffraction grating 10 is formed is preferably an inorganic material having high durability for high-output ultraviolet laser irradiation, and silicon, synthetic quartz having UV light resistance, a metal having high durability, or the like is used. As the metal material, copper, gold, molybdenum, or the like having characteristics such as high thermal conductivity, high melting point, and high hardness is suitable. A hard dielectric coating having low absorption of illumination light and a high damage threshold value is used.

FIGS. 17A to 17C are schematic views showing display screens of polarization distribution measurement results using the polarization diffraction grating 10.

FIG. 17A shows an illumination intensity distribution in the illumination spot 40. A graph of an illumination intensity on the same scale is shown below the illumination spot 40. A horizontal axis in the graph represents a position, and a vertical axis represents an illumination intensity.

FIG. 17B shows an s-polarization component mixing ratio distribution in the illumination spot 40. A graph of the s-polarization component mixing ratio on the same scale is shown below the illumination spot 40. That is, a horizontal axis in the graph represents a position, and a vertical axis represents the s-polarization component mixing ratio.

FIG. 17C shows a polarization major axis angle distribution in the illumination spot 40. A graph of the polarization major axis angle on the same scale is shown below the illumination spot 40. That is, a horizontal axis in the graph represents a position, and a vertical axis represents the polarization major axis angle.

The illumination intensity, the s-polarization component mixing ratio, and the major axis angle at each position are measured by the method described with reference to the graph in FIG. 14. The major axis angle indicates a deviation amount from p-polarization. A display range of data is limited to a range in which an illumination intensity value is a predetermined value or more, for example, $(1/e^2)$ or more of a maximum value of the illumination intensity in the illumination spot 40. This is because noise is relatively large in an area away from the illumination spot 40 where the illumination intensity is remarkably low, and it is difficult to accurately estimate the polarization state with the method described with reference to the graph in FIG. 14.

As an index Dave of an average polarization deviation amount (from p-polarization) in the Y-direction of the illumination spot 40, an average of a Y-direction distribution of the s-polarization mixing ratio shown in FIG. 17B is used. Here, the average is a simple average or a weighted average weighted by the Y-direction distribution. In addition, a standard deviation, a variance, or a maximum value (worst value) of the Y-direction distribution of the s-polarization mixing ratio shown in FIG. 17B is used as an index Δvar of a variation in the polarization deviation (from p-polarization) in the Y-direction of the illumination spot 40. By using these indices in a polarization adjustment procedure to be described later, it is possible to detect and correct a local polarization deviation in the illumination spot 40 in addition to detection and correction of an average polarization deviation in the illumination spot 40.

FIG. 17C is a graph showing a polarization major axis angle in the illumination spot 40.

As an average polarization deviation amount, an average of a Y-direction distribution of the polarization major axis angle may be used instead of the average of the Y-direction distribution of the s-polarization mixing ratio. In this case, in order to avoid a problem that positive and negative deviations cancel each other out and cannot be detected, an arithmetic mean of absolute values or a square root of a sum of squares may be used instead of a simple arithmetic mean.

FIG. 18 is a flowchart showing a procedure of polarization adjustment based on polarization distribution measurement using the polarization diffraction grating 10. This procedure is performed in an optical adjustment process of the illumination optical system 3 before an inspection.

First, the control device 71 adjusts an adjustment portion other than the polarization control unit 35 in the illumination optical system 3 to adjust an intensity and a shape of the illumination spot 40 (S11).

Next, the control device 71 measures a polarization state at each position in the illumination spot 40 by the method described in the graph in FIG. 14 (S12). Then, the control device 71 adjusts the angle of the half-wavelength plate 351 and/or the angle of the quarter-wavelength plate 352 to minimize the average polarization deviation index Dave (S13).

Next, in order to check and record a polarization distribution in a state in which the wavelength plate adjustment procedure in step S13 is completed, the control device 71 acquires data on the polarization distribution shown in FIGS. 17A to 17C, obtains and displays the average polarization deviation Δave and the variation Δvar in the polarization deviation, and stores the values (S14).

The control device 71 compares the average polarization deviation Δave with a preset threshold value TH1 and determines whether the average polarization deviation is within an allowable range (S15). In step S15, when the average polarization deviation Δave is less than the threshold value TH1 (Yes), the control device 71 proceeds to step S16, compares the variation Δvar in the polarization deviation with a preset threshold value TH2, and determines whether the variation Δvar in the polarization deviation is within an allowable range.

In step S16, when the variation Δvar in the polarization deviation is less than the threshold value TH2 (Yes), the control device 71 determines that both the average polarization deviation Δave and the variation Δvar in the polarization deviation are within the allowable ranges, proceeds to step S17, stores a polarization distribution measurement result measured in step S14, and completes the illumination polarization adjustment process.

In step S15, when the average polarization deviation Δave exceeds the threshold value TH1 (No), the control device 71 determines that a change over time occurs in any one of the optical elements of the illumination optical system 3, proceeds to step S20, and takes a measure to be described later against the change over time.

In step S20, the control device 71 performs, as the measure against the change over time, an optical element shift adjustment process of deviating an irradiation position on an optical element in order to avoid an irradiation area on the optical element that is estimated to be deteriorated due to irradiation.

In step S21, the control device 71 determines whether it is estimated that all effective areas of the optical element deteriorate and whether there is any usable irradiation position on the optical element, that is, whether there is another shift position candidate. When there is no other shift position candidate (No), the control device 71 determines that an adjustment error occurs, stores the polarization distribution measurement result, and ends the illumination polarization adjustment process.

In step S21, when there is another shift position candidate (Yes), the control device 71 shifts the optical element to that position and returns to step S11 to perform the subsequent processes again.

In step S16, when the variation Δvar in the polarization deviation exceeds the threshold value TH2, the control device 71 proceeds to step S18 to take a measure against the variation in the polarization deviation. The control device 71 searches for another adjustment condition for the half-wavelength plate 351 and the quarter-wavelength plate 352 within a range in which the average polarization deviation Dave is lower than the threshold value TH1, and determines whether there is any untried candidate condition (adjustment condition) (S19).

In step S19, when an untried candidate condition is found (Yes), the control device 71 sets the half-wavelength plate 351 and the quarter-wavelength plate 352 under the condition, returns to step S13, and performs the subsequent processes again. In step S19, when no untried candidate condition is found (No), the control device 71 determines that a change over time occurs in any one of the optical elements of the illumination optical system 3, and proceeds to the measure against the change over time in step S20.

FIG. 19 shows the measure against the change over time in the optical element of the illumination optical system 3.

In the embodiment, the anamorphic light collection mirror 310 is shifted and moved in the direction S2 by an automatic stage 310M, and a position irradiated with illumination light deviates within an effective area on a reflection plane of the anamorphic light collection mirror 310. Accordingly, it is possible to use a portion where performance is maintained while avoiding a portion deteriorated by long-time irradiation, and thus it is possible to avoid an influence of the deterioration of the optical element.

The above method can be similarly performed for the cylindrical lens 36, the anamorphic beam expander 39, and the reflection mirror 38 which are other optical elements having translational symmetry in the illumination optical system 3. Among these elements, since there is a relatively high risk that deterioration of the anamorphic light collection mirror 310 and illumination polarization deviation due to the deterioration occur, an example in which the anamorphic light collection mirror 310 is shifted and moved by the automatic stage 310M is shown as an example. The automatic stage 310M is a translational movement mechanism.

A reason why the risk of deterioration of the anamorphic light collection mirror 310 is relatively high is that a numerical aperture of light collection in the direction S1 is large and an incidence angle range of a light beam toward a surface of the anamorphic light collection mirror 310 is large. Therefore, it is difficult to coat the anamorphic light collection mirror 310 with a high reflectance coating, energy of irradiation light is accumulated, and damage due to the irradiation light is likely to occur.

The reason why the illumination polarization deviation due to the deterioration is likely to occur in the anamorphic light collection mirror 310 is that the illumination light is incident on a generatrix of the anamorphic light collection mirror 310 from a non-orthogonal direction and light beams other than a principal light beam become skewed light beams. For example, since the anamorphic beam expander 39 or the reflection mirror 38 has a flat reflection and refraction surface, it is possible to set polarization of incident light by designing or adjusting the attenuator 32 or the polarization control unit 35 such that p-polarization or s-polarization is uniform with respect to the reflection and refraction surface. When incident light is limited to either p-polarization or s-polarization, disturbance of emitted polarized light caused by birefringence (transmission difference, reflectance difference, or phase difference between p-polarization and s-polarization) of the optical element does not occur.

Although the cylindrical lens 36 has a curved surface, polarization of incident light is parallel to or orthogonal to a generatrix of the cylindrical lens 36, so that the polarization of the incident light can be limited to p-polarization or s-polarization with respect to a refraction plane of the cylindrical lens 36 regardless of an incidence position on the surface of the cylindrical lens 36. Accordingly, similarly to the above, even when there is birefringence with respect to p-polarization and s-polarization, disturbance of polarization of emitted light does not occur.

On the other hand, in incident light onto the anamorphic light collection mirror 310, the light beams other than the principal light beam become skewed light beams. Therefore, depending on an incidence position in the direction S1 on a reflection plane thereof, a direction of p-polarization and a direction of s-polarization determined at each position are different from each other. Therefore, even when polarization of incident polarized light is adjusted to p-polarization (or s-polarization) with reference to the principal light beam of the anamorphic light collection mirror 310, an s-polarization (or p-polarization) component orthogonal to each reflection plane is generated with respect to each reflection plane in the skewed light beams, and the components are superimposed on each other and interfere with each other to become emitted light. Therefore, in a case where birefringence with respect to p-polarization and s-polarization occurs (a variation due to a change over time) due to deterioration of the surface of the anamorphic light collection mirror 310, it is difficult to avoid disturbance of emitted polarized light.

Other optical elements that are likely to affect polarization of illumination light due to deterioration caused by long-time irradiation include the half-wavelength plate 351 and the quarter-wavelength plate 352. Since these wavelength plates are used after directions of two axes (a phase advance axis and a phase delay axis) with respect to polarization of incident light are adjusted by rotation adjustment in a plane, when the birefringence with respect to p-polarization and s-polarization is changed due to a change over time as in the above-described anamorphic light collection mirror 310, polarization of emitted light is affected and changed. Therefore, it is effective to provide translational movement mechanisms 351M and 352M also for the half-wavelength plate 351 and the quarter-wavelength plate 352 to shift an irradiation position when it is estimated that an optical element deteriorates based on the above-described method.

It is considered that, due to other factors such as a change over time in the laser light source 31, a variation in polarization distribution in the illumination spot 40 occurs upstream of the polarization control unit 35. In this case, a measure can be taken by additionally inserting a polarizer 353 into the polarization control unit 35 to form uniform linear polarization.

In the signal processing device 6, a plurality of pieces of scattered light data obtained from the imaging sensors 5-0, 5-1, 5-2, . . . are integrated, and defect extraction and defect size calculation are performed based on the integrated data. Signal processing for this purpose is based on the following defect signal and noise model.

A defect signal intensity $I_D(i,j)$ detected by a pixel j of an imaging sensor 5-$i$ is calculated by the following expression (11).

[Math 11]

$$I_D(i,j) \propto I_{in}(j) \times D(i,j) \qquad (11)$$

Here $I_{in}(j)$: illumination intensity in pixel j
D(I,j): defect scattering intensity in pixel j of imaging sensor 5-$i$ In the above expression on the defect signal intensity, $I_{in}(j)$ is an illumination intensity in the pixel j. D(i,j) is a coefficient of a defect scattering intensity in the pixel j of the imaging sensor 5-$i$.

When a noise intensity detected by the pixel j of the imaging sensor 5-$i$ is $\Delta I_N(i,j)$, the noise intensity is calculated by the following expression (12).

[Math 12]

$$\Delta I_N(i, j) \propto \sqrt{(\Delta H(i, j))^2 + (\Delta I_{Nsensor}(i, j))^2} \qquad (12)$$

Here H(i,j): coefficient of intensity of Haze in pixel j of imaging sensor 5-$i$
$I_{Nsensor}(i,j)$: sensor noise in pixel j of imaging sensor 5-$i$
H(i,j) is a coefficient of an intensity of haze due to sample surface scattering in the pixel j of the imaging sensor 5-$i$ and is calculated by the following expression (13).

[Math 13]

$$\Delta H(i,j) \propto \text{std}(I_{in}(j) \times H_{surf}(i,j) + I_{in}(\text{all}) \times H_{air}(i)) \qquad (13)$$

Here, std(x): normal distribution of x
$I_{in}$(all): total illumination intensity with which illumination spot 40 is irradiated
$H_{air}(i)$: intensity of Haze whose generation source is air scattering or stray light in imaging sensor 5-$i$ In the above expression on the noise intensity, $I_{in}$(all) is a total illumination intensity with which the illumination spot 40 is irradiated, and $H_{air}(i)$ is an intensity of haze generated by a generation source other than sample surface scattering (air scattering or stray light) in the imaging sensor 5-$i$.

The $I_{in}(j)$ is obtained for each pixel of the imaging sensor 5-$i$ based on a measurement value of the sample surface sensor 5a by the illumination polarization distribution intensity measurement method described in FIGS. 13 and 14.

D(i,j) is an expected value of a defect signal obtained by a scattered light simulation assuming a scattering model of any defect and is obtained based on polarization of irradiation light at a detection position of the pixel j and a simulation value of a scattering intensity of scattering in a direction of a detection optical system 4-$i$ due to the polarization. The polarization of the irradiation light at the detection position of the pixel j is obtained based on the measurement value of the sample surface sensor 5a by the illumination polarization distribution intensity measurement method described in FIGS. 13 and 14.

As the scattered light simulation assuming the scattering model of the defect, for example, there is a method shown in Bobbert, P. A., and J. Vlieger. "Light Scattering by a Sphere on a Substrate." Physica A: Statistical Mechanics and Its Applications 137, no. 12 (July 1986), which is a simulation method using a plate-shaped spherical defect as a model.

By using a light scattering simulation method such as a discrete dipole approximation (DDA) method or a finite differential time domain (FDTD) method as a simulation method using a defect of any shape as a model, an intensity of scattered light and an expected value of polarization for each detection direction with respect to any irradiation polarization can be obtained.

$H_{surf}(i,j)$ is a value obtained by a scattered light simulation assuming a scattering model of a sample surface and is obtained based on the polarization of the irradiation light at the detection position of the pixel j and the simulation value of the scattering intensity of the scattering in the direction of the detection optical system 4-$i$ due to the polarization. The polarization of the irradiation light at the detection position of the pixel j is obtained based on the measurement value of the sample surface sensor 5a by the illumination polarization distribution intensity measurement method shown in FIGS. 13 and 14. As the scattered light simulation assuming a scattering model of the sample surface, a calculation method of minute surface roughness scattered light based on the Rayleigh-Rice theory is used. In addition, while the polarization control unit 35 changes the illumination polarization, the imaging sensor 5-$i$ may actually measure and obtain scattered light of the sample to be actually inspected or a sample equivalent thereto.

The intensity of haze detected by the pixel j of the imaging sensor 5-$i$ includes haze due to air scattering or stray light other than sample surface scattering. The intensity of haze is proportional to the total intensity of the illumination light ($I_{in}$(all)), and a value thereof differs depending on a detection direction ($H_{air}(i)$). Since the generation source is not on the sample surface and the haze is not detected by imaging on the imaging sensor 5-$i$, the haze does not depend on the pixel j of the sensor.

$\Delta x$ indicates a variation in the value of x, and a standard deviation is used as an index of the variation. Since variations of H(i,j) and $I_{Nsensor}(i,j)$ are not correlated with each other, a variation in the sum $I_N(i,j)$ thereof is represented by a square root of a sum of squares.

The defect signal intensity $I_D(i,j)$ and the noise intensity $\Delta I_N(i,j)$ obtained by the above expressions are weighted by a weight W(i,j) and summed up for a symbol i corresponding to the imaging sensor to obtain an integrated defect signal intensity $I_D$(all,j) of the pixel j as shown in an expression (14).

[Math 14]

$$I_D(\text{all},j) \propto \Sigma_i(W(i,j) \times I_D(i,j)) \quad (14)$$

The integrated noise intensity can be expressed by the following expression (15).

[Math 15]

$$\Delta I_N(\text{all}, j) = \sqrt{\sum_i \left(W(i, j)^2 \times \Delta I_N(i, j)^2\right)} \quad (15)$$
$$= \sqrt{\sum_i \left(W(i, j)^2 \times \left((\Delta H(i, j))^2 + (\Delta I_{Nsensor}(i, j))^2\right)\right)}$$

When a plurality of signal intensities are weighted and summed up in this manner, the weight W(i,j) is set to a larger value as the defect signal intensity $I_D(i,j)$ becomes larger, and is set to a smaller value as $\Delta I_N(i,j)$ becomes larger to increase an SN ratio of an integrated signal. Specifically, by setting the weight W(i,j) as in an expression (16), the SN ratio of the integrated signal is maximized.

[Math 16]

$$W(i, j) \propto I_D(\text{all}, j) / \sqrt{(\Delta H(i, j))^2 + (\Delta I_{Nsensor}(i, j))^2} \quad (16)$$

FIGS. 20A and 20B show a principle for improving the SN ratio of the integrated signal and determining a defect by weighted signal addition.

FIG. 20A shows a principle for improving the SN ratio of the integrated signal and determining a defect by signal addition without weighting. FIG. 20B shows the principle for improving the SN ratio of the integrated signal and determining a defect by weighted signal addition. A multi-dimensional space (feature space) defined by a plurality of signal intensities is considered. In FIGS. 20A and 20B, for the sake of simplification of description, it is assumed that the space is two-dimensional in which i=1, 2.

In FIG. 20A, a data point is projected onto an intermediate 45° axis (subspace) of the graph of two axes of $X_1$ and $X_2$ and a value on the axes is obtained to add a signal without weighting (W(i,j)=1). An origin of the graph of the two axes of $X_1$ and $X_2$ is a center value of a frequency indicated by $I_N(2,j)$ and $I_N(1,j)$. A histogram of $I_N(2,j)$ is shown on a left side of the graph of the two axes of $X_1$ and $X_2$. A histogram of $I_N(1,j)$ is shown below the graph of the two axes of $X_1$ and $X_2$. The histogram of $I_N(2,j)$ is gentler and has wider data distribution than the histogram of $I_N(1,j)$.

Therefore, when a threshold value Th is set so as not to detect noise, noise on the signal $X_2$ axis having relatively large noise among the two axes is rate-limiting, and the threshold value Th is set to be high. In addition, a defect signal is pulled by a defect signal of the $X_1$ axis having a relatively small defect signal among the two axes, and the threshold value Th is set to be low.

In FIG. 20B, a data point of a defect is projected onto an axis (subspace) inclined by normalization of a standard deviation on a graph of $X_{1a}$, $X_{2a}$ obtained by normalizing a scale of the two axes of $X_1$, $X_2$ by a standard deviation of noise, and a value on the axes is obtained to add a weighted signal (W(i,j)=1). Accordingly, since a noise distribution is an isotropic circle or sphere, an influence of an axis with large noise and an influence of an axis with small noise are equalized. In addition, the defect signal is projected such that a distance to noise is maximized. Therefore, the SN ratio of the integrated signal is maximized.

The weighted addition corresponds to evaluating an SN ratio of a defect using a Mahalanobis distance as a scale in the subspace in which the defect signal is maximized in the feature space, and is preferably a method for evaluating an abnormality degree based on multi-dimensional signal data having different weights of noise and signals. By setting the threshold value Th for the integrated signal obtained by the above method and determining a defect based on a magnitude relationship between the defect signal and the threshold value Th, it is possible to perform an inspection with higher sensitivity than a case where a defect is determined using only a signal of a single imaging sensor or a simple sum of signals of a plurality of imaging sensors. That is, it is possible to detect a weak signal of a smaller defect while preventing erroneous detection of noise.

In the embodiment, by the illumination polarization distribution intensity measurement method described with reference to FIGS. 13 and 14, the illumination polarization distribution is obtained for each pixel of the imaging sensors 5-1, 5-2, ... based on the measurement value of the sample surface sensor 5$a$. Therefore, the defect signal intensity expected value $I_D(i,j)$ and an actual measurement value of the variation $\Delta H(i,j)$ in the intensity of haze are obtained for each pixel of the imaging sensors 5-1, 5-2, ..., and the weight W(i,j) can be set to an optimum value for each pixel based on $I_D(i,j)$ and $\Delta H(i,j)$. Therefore, it is possible to perform an inspection with higher sensitivity.

Modification

The invention is not limited to the above embodiment and includes various modifications. For example, the above embodiment is described in detail to facilitate understanding of the invention, and the invention is not necessarily limited to one including all the configurations described above. A part of the configuration according to one embodiment can be replaced with the configuration according to another embodiment, and the configuration according to one embodiment can be added to the configuration according to another embodiment. In addition, a part of the configuration according to each embodiment may also be added to, deleted from, or replaced with other configurations.

A part or all of the configurations, functions, processing units, processing methods, and the like described above may be implemented by hardware such as an integrated circuit. The configurations, functions, and the like described above may be implemented by software by a processor interpreting and executing a program for implementing each function. Information such as a program, a table, and a file for implementing each function can be stored in a recording device such as a memory, a hard disk, and a solid-state drive (SSD), or a recording medium such as a flash memory card and a digital versatile disk (DVD).

In each embodiment, the control lines and the information lines are considered to be necessary for description, and all the control lines and the information lines are not necessarily shown in the product. Actually, it may be considered that almost all the configurations are connected to each other.

REFERENCE SIGNS LIST

1: sample
10: polarization diffraction grating (anisotropic pattern substrate)
100: defect inspection device
20: wafer
22: incident light
24: incident light
3: illumination optical system
31: laser light source
32: attenuator
321: first polarization plate
322: half-wavelength plate
323: second polarization plate
33: emission light adjustment unit
331, 332: reflection mirror
34: beam expander
341, 342: lens
35: polarization control unit
351: half-wavelength plate
351M: translational movement mechanism
352: quarter-wavelength plate
352M: translational movement mechanism
353: polarizer
36: cylindrical lens
371, 372: reflection mirror
38: reflection mirror
381: adjustment mechanism
39: anamorphic beam expander
310: anamorphic light collection mirror (light collection element)
310M: automatic stage
40: illumination spot
4-0, 4-1, 4-2 . . . : detection optical system
411: light collection lens
412: half-wavelength plate
42: polarization beam splitter
431: half-wavelength plate
433, 434: cylindrical lens
435: imaging lens
44: beam diffuser
451: light collection lens
452: imaging lens
46: reflection mirror
47: polarization control unit (polarization element)
471: quarter-wavelength plate
472: half-wavelength plate
48: polarization beam splitter
49: imaging lens (imaging element)
5a: sample surface sensor (observation image detector)
5b: imaging sensor
5-0, 5-1 . . . : imaging sensor
6: signal processing device
61: illumination spot position analysis circuit
62: memory
63: signal integration circuit
64: defect detection circuit
71: control device (control unit)
72: user interface
73: monitor
8: height measurement unit
81: light collection lens
82: imaging lens
83: two-dimensional sensor
9: actuator
ST: stage
ST1: sample stage
ST2: scanning device
S1: direction
S2: direction
LD1: illumination intensity distribution
L1: beam width
L2: width
LD2: illumination intensity distribution
OA, OA1, OA2: optical axis
OI: optical image

The invention claimed is:

1. A defect inspection device comprising:
an illumination optical system including a polarization element configured to switch polarization of irradiation light between first polarization and second polarization orthogonal to the first polarization;
an anisotropic pattern substrate configured to emit diffraction light of a specific order of the irradiation light, a diffraction efficiency of the specific order of the first polarization of the irradiation light being equal to or less than 20% of a diffraction efficiency of the specific order of the second polarization, the anisotropic pattern substrate being settable at a light collection position of the irradiation light on a sample stage surface and having an anisotropic pattern whose period is equal to or less than twice a wavelength of the irradiation light;
an imaging element configured to collect the diffraction light of the specific order emitted from an irradiation position of the irradiation light to form an optical image;
an observation image detector configured to detect the optical image formed by the imaging element; and
a control unit configured to control the polarization element in such a manner that an intensity in a set area of an intensity distribution of the optical image detected by the observation image detector is within a set range.

2. The defect inspection device according to claim 1, further comprising:
a light collection element configured to collect laser light from an angle inclined with respect to a normal line of the sample stage surface to an irradiation position on the sample stage surface to emit the irradiation light.

3. The defect inspection device according to claim 1, wherein
the anisotropic pattern of the anisotropic pattern substrate is a line-and-space pattern,
a repetition period P of the line-and-space pattern is within ±20% of a value obtained by dividing a wavelength λ of the irradiation light by a sine function of an incidence angle θ, and
a height of the line-and-space pattern is approximately ½ times the wavelength of the irradiation light.

4. The defect inspection device according to claim 1, wherein
the anisotropic pattern substrate emits the diffraction light of the specific order in a direction along a normal line of the sample stage surface.

5. A defect inspection method comprising:
a procedure of collecting laser light from an angle inclined with respect to a normal line of a sample stage surface to an irradiation position on the sample stage surface to emit irradiation light;
a procedure of enabling switching, by a polarization element provided in an illumination optical system, polarization of the irradiation light between first polarization and second polarization orthogonal to the first polarization;
a procedure of emitting diffraction light by an anisotropic pattern substrate, a diffraction efficiency of a specific order of the first polarization of the irradiation light being equal to or less than 10% of a diffraction efficiency of the specific order of the second polarization, the anisotropic pattern substrate being settable at a light collection position of the irradiation light on the sample stage surface and including an anisotropic pattern whose period is equal to or less than twice a wavelength;
a procedure of collecting, by an imaging element, the diffraction light of the specific order emitted from an irradiation position of the irradiation light to form an optical image;
a procedure of detecting, by an observation image detector, the optical image formed by the imaging element; and
a procedure of controlling the polarization element in such a manner that an intensity in a set area of an intensity distribution of the optical image detected by the observation image detector is within a set range.

6. The defect inspection method according to claim 5, wherein
the anisotropic pattern of the anisotropic pattern substrate is a line-and-space pattern,
a repetition period P of the line-and-space pattern is within ±20% of a value obtained by dividing a wavelength λ of the irradiation light by a sine function of an incidence angle θ, and
a height of the line-and-space pattern is approximately ½ times the irradiation light.

7. The defect inspection method according to claim 5, wherein
the diffraction light diffracted by the anisotropic pattern substrate is emitted in a direction along a normal line of the sample stage surface.

8. An adjustment substrate to be set on a sample stage surface of a defect inspection device, the adjustment substrate comprising:
an anisotropic pattern of a line-and-space pattern, wherein
a repetition period P of the line-and-space pattern is within ±20% of a value obtained by dividing a wavelength λ of irradiation light of the defect inspection device by a sine function of an incidence angle θ, and
a height of the line-and-space pattern is approximately ½ times the wavelength λ of the irradiation light.

\* \* \* \* \*